US011234556B2

(12) United States Patent
Lee et al.

(10) Patent No.: US 11,234,556 B2
(45) Date of Patent: Feb. 1, 2022

(54) COOKING APPARATUS

(71) Applicant: LG ELECTRONICS INC., Seoul (KR)

(72) Inventors: Kookhaeng Lee, Seoul (KR); Yangho Kim, Seoul (KR); Junho Seok, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 597 days.

(21) Appl. No.: 16/159,807

(22) Filed: Oct. 15, 2018

(65) Prior Publication Data

US 2019/0110641 A1 Apr. 18, 2019

Related U.S. Application Data

(60) Provisional application No. 62/571,917, filed on Oct. 13, 2017.

(51) Int. Cl.
*A47J 37/06* (2006.01)

(52) U.S. Cl.
CPC ................................ *A47J 37/0676* (2013.01)

(58) Field of Classification Search
CPC .......... A47J 37/06; A47J 27/002; A47J 36/00; A47J 37/067; A47J 37/0676; A47J 37/0682
USPC .......... 99/340, 341, 342, 343, 422, 425, 445
See application file for complete search history.

(56) References Cited

U.S. PATENT DOCUMENTS

| 4,608,917 | A | 9/1986 | Faaborg |
| 2010/0154655 | A1 | 6/2010 | Mehta et al. |
| 2010/0175682 | A1 | 7/2010 | Erikson et al. |
| 2014/0261009 | A1 | 9/2014 | Bringe et al. |
| 2015/0335200 | A1* | 11/2015 | Ortner .................. A47J 37/067 99/425 |
| 2018/0353005 | A1 | 12/2018 | Lee et al. |

FOREIGN PATENT DOCUMENTS

| DE | 20 2005 011406 | 1/2006 |
| EP | 3 415 058 | 12/2018 |
| KR | 10-1899249 | 9/2018 |
| WO | WO 2008/125258 | 10/2008 |

OTHER PUBLICATIONS

European Search Report dated Jul. 4, 2019 issued in Application No. 18215399.9.
Korean Office Action dated Mar. 5, 2020.

* cited by examiner

*Primary Examiner* — Phuong T Nguyen
(74) *Attorney, Agent, or Firm* — Ked & Associates, LLP

(57) ABSTRACT

Provided is a cooking apparatus in which a heating plate, a frame, and a pocket part are independently provided and which has a structure that is capable of securing use convenience and safety by a coupled structure of the heating plate, the frame, and the pocket part.

20 Claims, 22 Drawing Sheets

COOKING APPARATUS

CROSS-REFERENCE TO RELATED APPLICATIONS

This application is based on and claims the benefit of U.S. Provisional Patent Application No. 62/571,917, filed on Oct. 13, 2017, which is hereby incorporated by reference in its entirety.

BACKGROUND

The present disclosure relates to a cooking apparatus, and more particularly, to a cooking apparatus in which a configuration of a cooktop part is modularized to be combined in a shape desired by a user.

In general, a cooking apparatus is a home appliance for cooking food, which is installed in a kitchen space to cook the food according to user's intension. Such a cooking apparatus may be classified into various types according to a heat source or type to be used and a kind of fuel.

When the cooking apparatus is classified according to types of food to be cooked, the cooking apparatus may be classified into an open type cooking apparatus and a close type cooking apparatus according to types of spaces in which food is placed. The close type cooking apparatus includes an oven, a microwave oven, and the like, and the open type cooking apparatus includes a cooktop, a hob, and the like.

In recent years, a complex type cooking apparatus in which an open type cooking apparatus is disposed above a close type cooking apparatus has been developed and also has been developed to be combined with apparatuses having various cooking manners and structures.

A griddle is provided in a shape in which a heating unit such as a gas burner or a heating wire is installed below a cooking plate having an opened upper portion. Such a griddle is used for grilling meat, vegetables, and the like on a cooking plate having an iron plate shape, which is heated by the heating unit. The griddle is mainly used in large restaurants and food service stations, but recently is increasingly used for household use.

The griddle has a risk of fire due to oil generated during cooking and thus requires careful attention during the cooking and use.

SUMMARY

Embodiments provide a griddle device having improved use convenience and a cooking apparatus including the griddle device.

Embodiments also provide a griddle device having improved safety and a cooking apparatus including the griddle device.

Embodiments also provide a griddle device having improved assemblability and productivity and a cooking apparatus including the griddle device.

Embodiments also provide a griddle device having an improved outer appearance and a cooking apparatus including the griddle device.

Embodiments also provide a griddle device having a structure that is capable of being mounted at one side of a cooking apparatus in a module manner.

Embodiments also provide a cooking apparatus in which a plurality of modularized cooking devices have a common mounting structure.

In one embodiment, a griddle device includes: a housing having an opened top surface; a burner provided in the housing; a frame disposed along an opened circumference of an upper end of the housing and having a frame opening; a heating plate coupled to the frame to cover a portion of the frame opening and providing a cooking surface heated by the burner; and a pocket part configured to cover a remaining portion of the frame opening at one end of the heating plate and recessed to provide a space in which foreign substances are accommodated, wherein the pocket part is mounted to be connected between the frame and the heating plate.

The heating plate may include: a heating part providing the cooking surface; and an edge part disposed along a circumference of the heating part and extending upward from the heating part to contact an inner surface of the frame opening, wherein the heating part may have a thickness greater than that of the edge part.

The heating part and the edge part may be separately molded and bonded to each other through welding.

The edge part may be disposed along a remaining circumferential surface except for one end contacting the pocket part.

A coupling member coupled to the edge part by passing through the frame may be disposed on an outer surface of the frame.

The frame opening may include: a plate mounting part on which the heating plate is mounted; and a pocket mounting part on which the pocket part is mounted at one end of the plate mounting part, wherein the pocket mounting part may have a width greater than that of the plate mounting part, and both ends of the pocket mounting part may be further recessed than the plate mounting part.

An inner surface of the plate mounting part may have an inclination to protrude inward from a lower side to an upper side.

A pocket tray into which the foreign substances are introduced from the heating plate may be introduced are detachably accommodated inside the pocket part, and a tray seating part on which each of both ends of the pocket tray is seated may be disposed on each of both side surfaces of the pocket mounting part.

A coupling hole may be defined in an inner bottom surface of the pocket part, and the coupling member coupled inside the pocket part may pass through the coupling hole and be coupled to the housing.

A pocket edge protruding outward may be disposed along an upper end of the pocket part, wherein the pocket edge may include: a front part coupled to a front end of the frame; a rear part coupled to a bottom surface of the heating plate; and a side part coupled to each of both side surfaces of the pocket mounting part.

An accommodation groove recessed in a shape corresponding to the side part and coupled to the side part may be defined in a lower end of each of both the side surfaces of the pocket mounting part.

The heating plate may further extend to the inside of the pocket part than the front part.

A plate groove may be recessed from the bottom surface of the heating plate, and the plate groove may be disposed further forward than the front part.

A pocket inclined part that is inclined from the inside of the pocket part to the heating plate may be disposed on an upper end of the front part.

A barrier partitioning the inside of the housing into front and rear spaces may be provided in the housing, the burner may be accommodated in the partitioned front space, and the pocket part may be accommodated in the partitioned rear space.

The barrier may include: a partition part vertically extending from a bottom surface of the housing; an inclined part inclinedly extending from an upper end of the partition part; and a contact part bent from a lower end of the inclined part to support a bottom surface of the heating plate, wherein, when the heating plate is mounted, the inclined part may be elastically deformed to allow the contact part to press and support the heating plate.

The inclined part may have a width less than that of the partition part so that a barrier stepped part is disposed on each of both side ends of the inclined part and the partition part, and the barrier stepped part may be seated on a first stepped part that is stepped on an inner surface of the frame opening.

A second stepped part in which an upper end of the pocket part is accommodated may be further disposed on an inner surface of the frame opening above the first stepped part, and the second stepped part may further protrude than the first stepped part.

In another embodiment, a cooking apparatus includes: an oven part on which a door opening and closing a cavity defining a cooking space is disposed on a front surface thereof; a cooktop part provided above the oven part to define a top surface of the cooking apparatus; and an exhaust part provided behind the cooktop part to exhaust heat of the oven part and the cooktop part, wherein the cooktop part includes: a module mounting space provided in the cooktop part and having an opened top surface; and a griddle device mounted in the module mounting space to define at least a portion of a top surface of the cooktop part, wherein the griddle device includes: a housing having an opened top surface; a burner provided in the housing; a frame disposed along an opened circumference of an upper end of the housing and having a frame opening; a heating plate coupled to the frame to cover a portion of the frame opening and providing a cooking surface heated by the burner; and a pocket part configured to cover a remaining portion of the frame opening at one end of the heating plate and recessed to provide a space in which foreign substances are accommodated, wherein the pocket part is mounted to be connected between the frame and the heating plate.

A gas stove defining a remaining portion of the top surface of the cooktop part may be disposed at a side of the griddle device, and the frame may be made of the same material as a grating defining an outer appearance of an upper portion of the gas stove and disposed at the same height as the grating.

The details of one or more embodiments are set forth in the accompanying drawings and the description below. Other features will be apparent from the description and drawings, and from the claims.

DETAILED DESCRIPTION OF THE EMBODIMENTS

Hereinafter, specific embodiments of the present invention will be described in detail with reference to the drawings. However, there is no intention to limit the present invention to the embodiments in which spirit of the present invention is provided and other embodiments which is included in the range of spirit of the other degenerative inventions or the present invention can be easily proposed by adding, changing, deleting or the like of another component.

Figure 1:
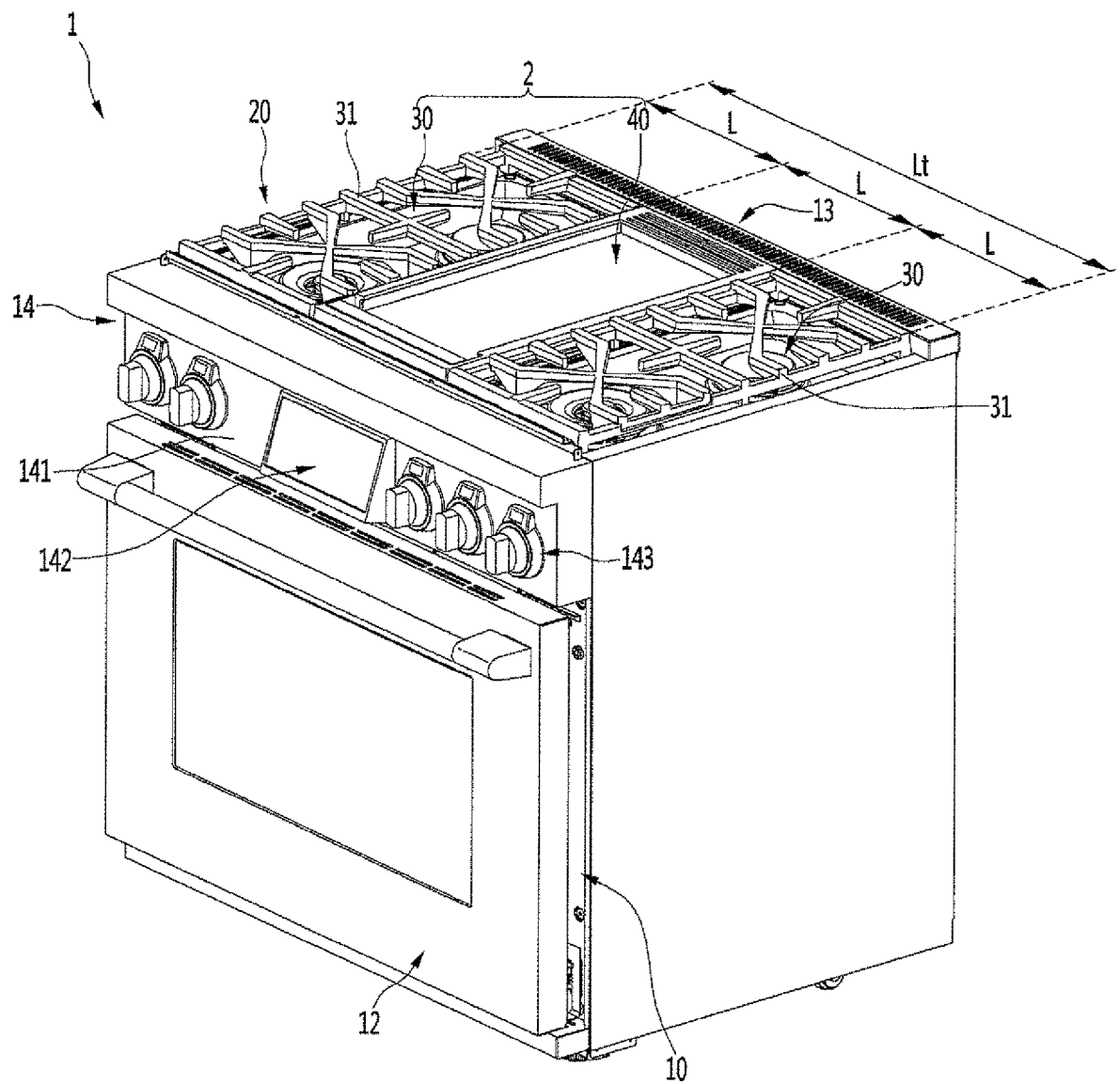
FIG. 1 is a perspective view of a cooking apparatus according to an embodiment.
Figure 2:
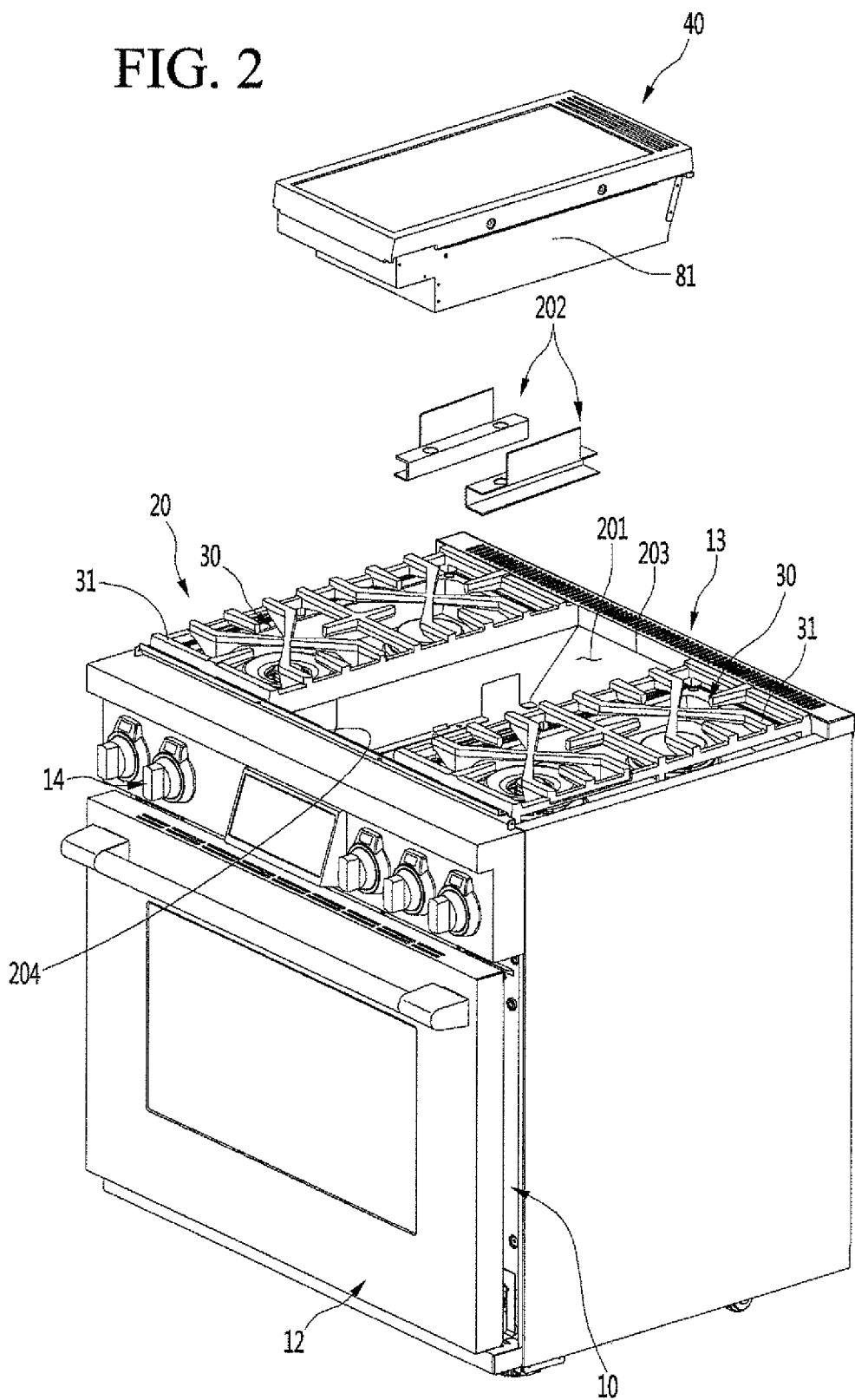
FIG. 2 is an exploded perspective view illustrating a state in which a griddle is separated from the cooking apparatus.

FIG. 1 is a perspective view of a cooking apparatus according to an embodiment. Also, FIG. 2 is an exploded perspective view illustrating a state in which a griddle is separated from the cooking apparatus.

As illustrated in the drawings, a cooking apparatus 1 according to an embodiment may be a complex type cooking apparatus (hereinafter, referred to a cooking apparatus). An oven part 10 may be provided in a lower portion, and a cooktop part 20 may be disposed in an upper portion.

A cavity that is a cooking space may be provided in the oven part 10 and be opened by a door 12 that is openable at a front side thereof. The oven part 10 may be provided on each of both left and right sides. Thus, a pair of cavities may be provided in both left and right sides, and the cavities may be relatively opened and closed by the doors 12. The oven part 10 may be provided in plurality, and the plurality of oven parts 10 may be disposed vertically or horizontally.

A cooktop part 20 may be disposed above the oven part 10. The cooktop part 20 may be disposed on a top surface of the cooking apparatus 1. Also, various cooking devices that are capable of cooking food through the top surface of the cooking apparatus 1 may be mounted on the cooktop part 20 in a module type. Thus, the various cooking devices that are capable of being mounted on the cooktop part 20 may be called cooking modules.

In detail, the plurality of cooking modules 2 may be combined to be mounted on the cooktop part 20 as a whole. The cooking module 2 assembled to constitute the cooktop part 20 may include a gas stove 30 constituted by at least one or more gas burners 501, 502, 503, and 504 and a griddle device 40 that is capable of cooking food on a heated iron plate. Also, as necessary, the cooking module may include an induction stove that is capable of heating a container in an induction heating manner and a sous vide device that is capable of performing sealed cooking at a low temperature such as sous vide cooking.

The cooking modules 2 may be mounted on the cooktop part 20, and a portion of the plurality of cooking modules 2 may be selectively mounted in a state in which the oven part 10 is assembled. That is, the cooking modules 2 may be continuously arranged in parallel to each other on the cooktop part 20, and a top surface of the cooktop part 20 may be defined by the plurality of cooking modules 2.

The cooking modules 2 may be mounted at any position on the cooktop part 20 and be selectively mounted according to required combination. Also, when the cooking modules 2 are freely combined and disposed to be mounted, the cooking modules 2 may be mounted at the same height to provide a sense of unit. In addition, a separate finishing material such as a side deco (not shown) may be provided between the cooking modules 2 to improve the sense of unit.

As illustrated in the drawings, a griddle device 40 may be disposed at a center of the cooktop part 20, and the gas stove 30 may be disposed at each of left and right sides. Here, the pair of gas stoves 30 disposed at both the sides of the griddle device 40 may have the same structure.

Each of the gas stove 30 and the cooking module 2 including the griddle device 40 may have the same forward backward length as the cooktop part 20. Thus, when the cooking module 2 is mounted on the cooktop part 20, front and rear ends of the cooking module 2 may be respectively seated on front and rear ends of the cooktop part 20.

Also, a length of the cooking module 2 in a horizontal direction (a left and right direction in FIG. 1) may correspond to a 1/N of an total horizontal length Lt of the cooktop part 20 or an inner space of the cooktop part 20 and also correspond to a unit length L.

For example, the length of the cooktop part 20 in the horizontal direction may be set to three unit lengths L, and a horizontal length of each of the griddle device 40 and the gas stove 30 may correspond to one unit length L.

In the state in which all the cooking modules 2 are mounted on the cooktop part 20, the cooking module 2 may have the same height. That is, the griddle device 40 and the gas stove 30 may be disposed on the same plane in the state of being mounted on the cooktop part 20. A grating 31 of the gas stove 30 and a frame 60 of the griddle device 40 may be disposed on the same plane to provide a sense of unit to the cooking apparatus 1 as a whole.

Here, the cooking module 2 may be fixed and mounted on a mounting bracket 202 provided in the cooktop part 20. For example, the mounting bracket 202 may be mounted in a module mounting space 201 defined in the cooktop part 20 to support the griddle device 40 at a lower side. Also, the griddle device 40 may be coupled to the mounting bracket 202 and then fixed and mounted on the cooktop part 20.

An exhaust part 13 may be provided on a rear end of the cooktop part 20. The exhaust part 13 may exhaust air within the oven part 10 and also discharge heat within the cooktop part 20 to the outside.

A plurality of holes may be continuously defined in the form of a grill in a top surface of the exhaust part 13. Also, the inside of the exhaust part 13 may communicate with the oven part 10 and the cooktop part 20. Thus, when the oven part 10 operates, heat and a combustion gas of the oven part 10 may be exhausted. Also, heat and a combustion gas generated when the cooking module 2 operates may be exhausted. In addition, cooling air introduced into the cooktop part 20 from the outside of the cooking apparatus 1 to cool the inside of the cooktop part 20 may also be discharged through the exhaust part 13.

A manipulation part 14 is provided on a front surface of the cooktop part 20. The manipulation part 14 may include a manipulation panel 141 defining the front surface of the cooktop part 20, a display 142 disposed on a center of the manipulation panel 141 to display operation information of the cooking apparatus 1, and a manipulation member 143 provided in plurality on both sides of the manipulation panel 141 with respect to the display 142. The manipulation members 143 may be provided as, for example, knobs and disposed at positions corresponding to mounting positions of the cooking modules 2 constituting the cooktop part 20. Thus, when the cooking modules 2 are changed in arrangement, the manipulation member 143 may also move to be changed in position.

Also, even though the cooking modules 2 are arranged in any arrangement order in the cooktop part 20, the manipulation members 143 may be disposed on the corresponding front area. Thus, although various cooking modules 2 are provided, a user may intuitively manipulate the corresponding manipulation member 143.

Figure 3:
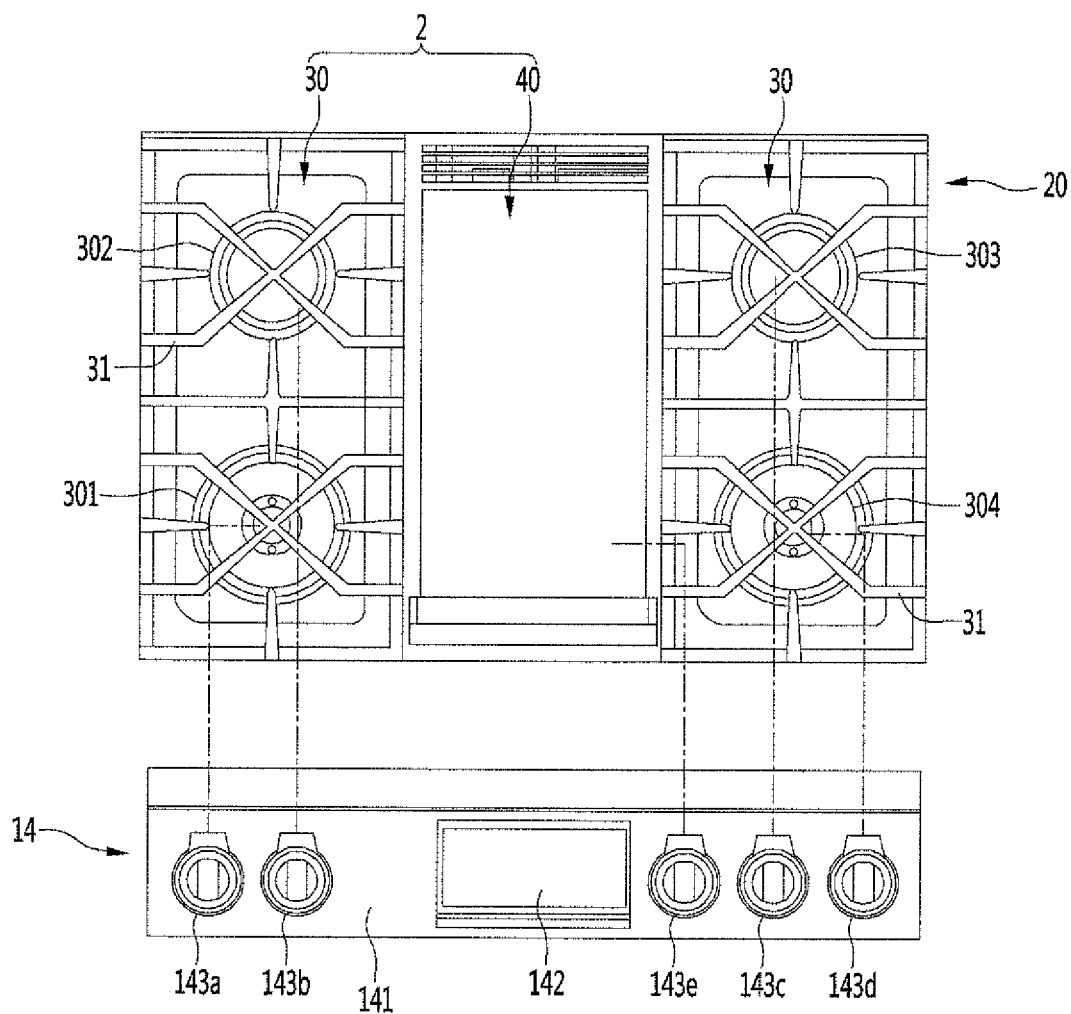
FIG. 3 is a view illustrating a relationship between a cooktop part and a manipulation part.

FIG. 3 is a view illustrating a relationship between the cooktop part and the manipulation part.

As illustrated in the drawing, the display 142 and the plurality of manipulation members 143 may be disposed on a front surface of the manipulation panel 141.

The display 142 may display an overall operation state of the cooking apparatus 1 and thus display various information on a screen. Also, the display 142 may be provided as the form of a touch screen to receive user's manipulation. Also, the display 142 may be configured to set and manipulate an operation of the oven part 10 through user's touch manipulation. Alternatively, the display 142 may be configured to set and manipulation operations of the cooking modules 2 in addition to the oven part 10. The display 142 may have a length that is less than at least one unit length L. Thus, the display 142 together with at least one manipulation member 143 may be provided within an area of the unit length L.

As illustrated in the drawings, in the manipulation members 143, first to fourth manipulation members 143a, 143b, 143c, and 143d may be disposed at a front side of the gas stove 30. The first to fourth manipulation members 143a, 143b, 143c, and 143d may be disposed on both left and right sides with respect to the display 142. The first manipulation member 143a and the second manipulation member 143b may be disposed at the front side of a first burner 301 and a second burner 302, and the third manipulation member 143c and the fourth manipulation member 143d may be may be disposed at the front side of a third burner 303 and a fourth burner 304.

The first manipulation member 143a may adjust thermal power of the first burner 301, and the second manipulation member 143b may be adjust thermal power of the second burner 302 that is disposed at the front side of the first burner 301. Also, the third manipulation member 143c may adjust thermal power of the third burner 303, and the fourth manipulation member 143d may be adjust thermal power of the fourth burner 304 that is disposed at the rear side of the third burner 303.

Also, a fifth manipulation member 143e capable of adjusting a temperature of the griddle device 40 may be disposed at the front side of the griddle device 40. The fifth manipulation member 143e may be disposed at a side of the display 142. Thus, the fifth manipulation member 143e and the display 142 may be disposed at a center or a position adjacent to the center of the manipulation part 14.

Hereinafter, the griddle device 40 mounted on the cooking apparatus 1 will be described in more detail with reference to the accompanying drawings.

Figure 4:
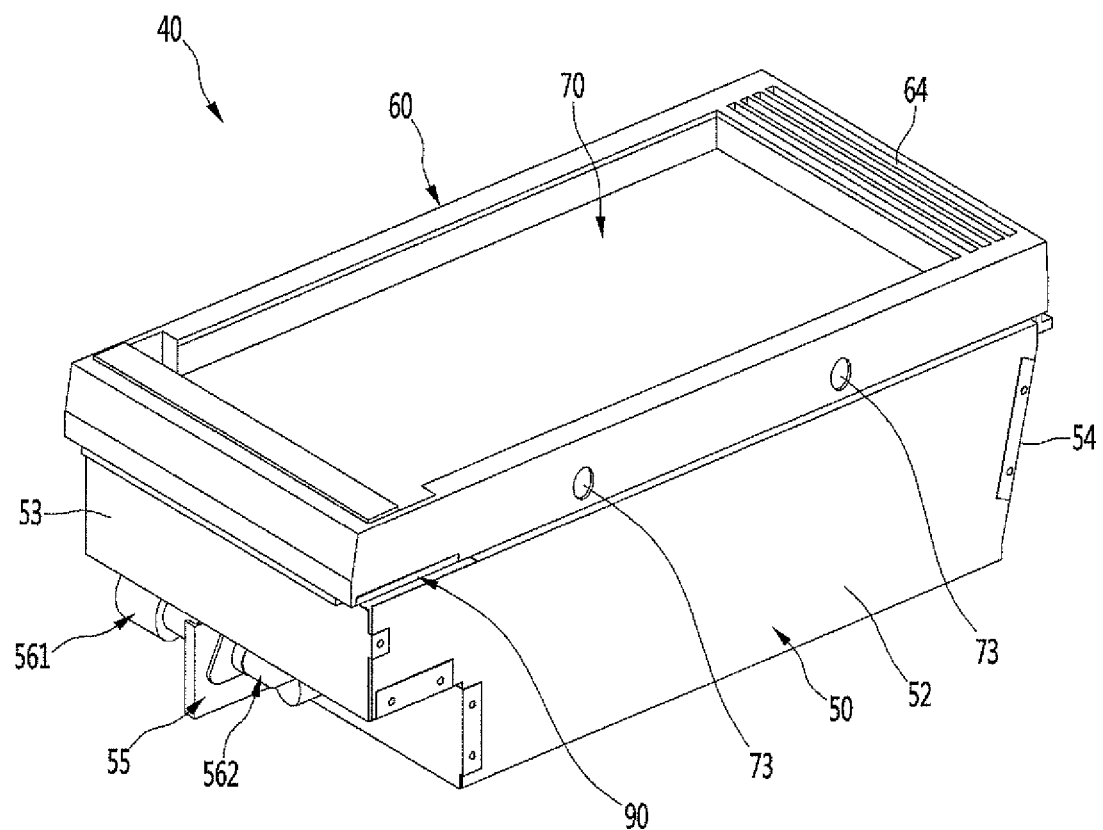
FIG. 4 is a perspective view of the griddle when viewed from an upper side.
Figure 5:
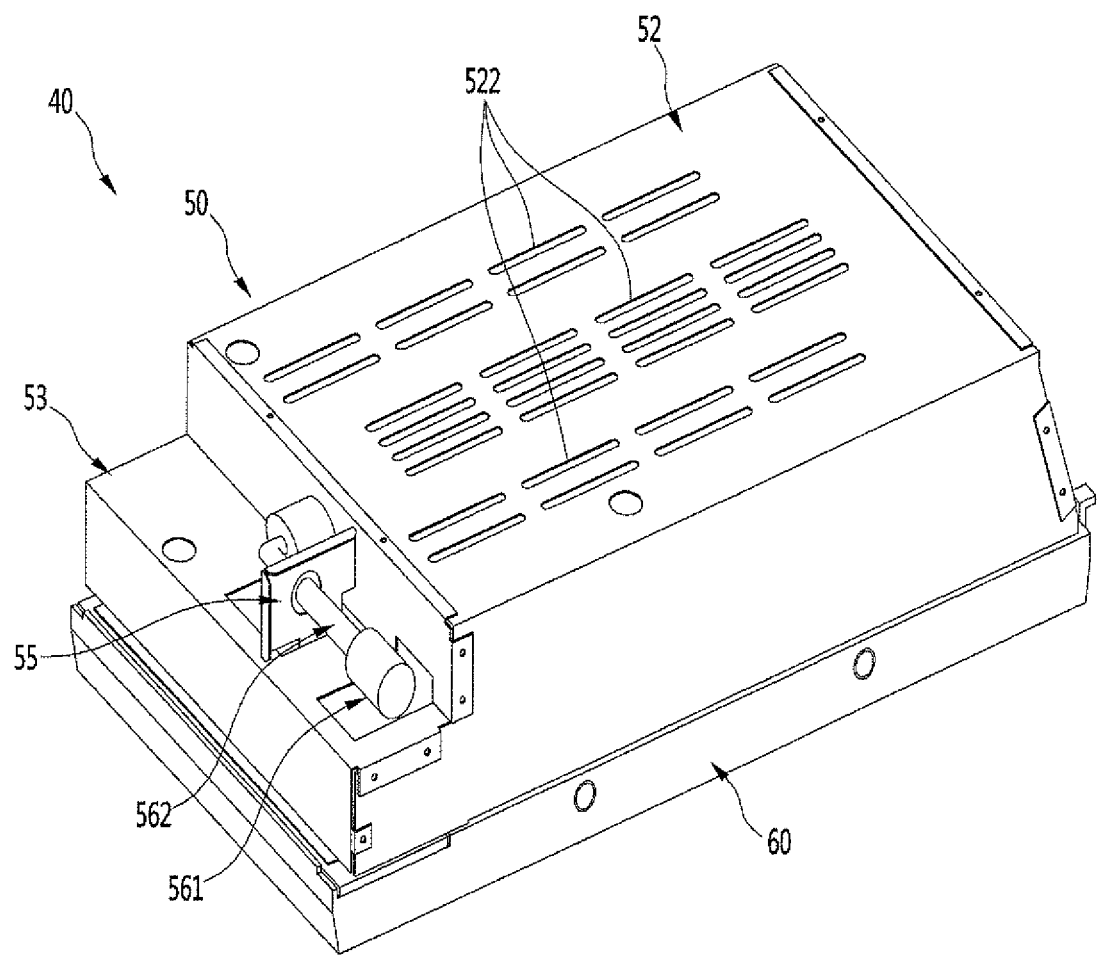
FIG. 5 is a perspective view of the griddle when viewed from a lower side.
Figure 6:
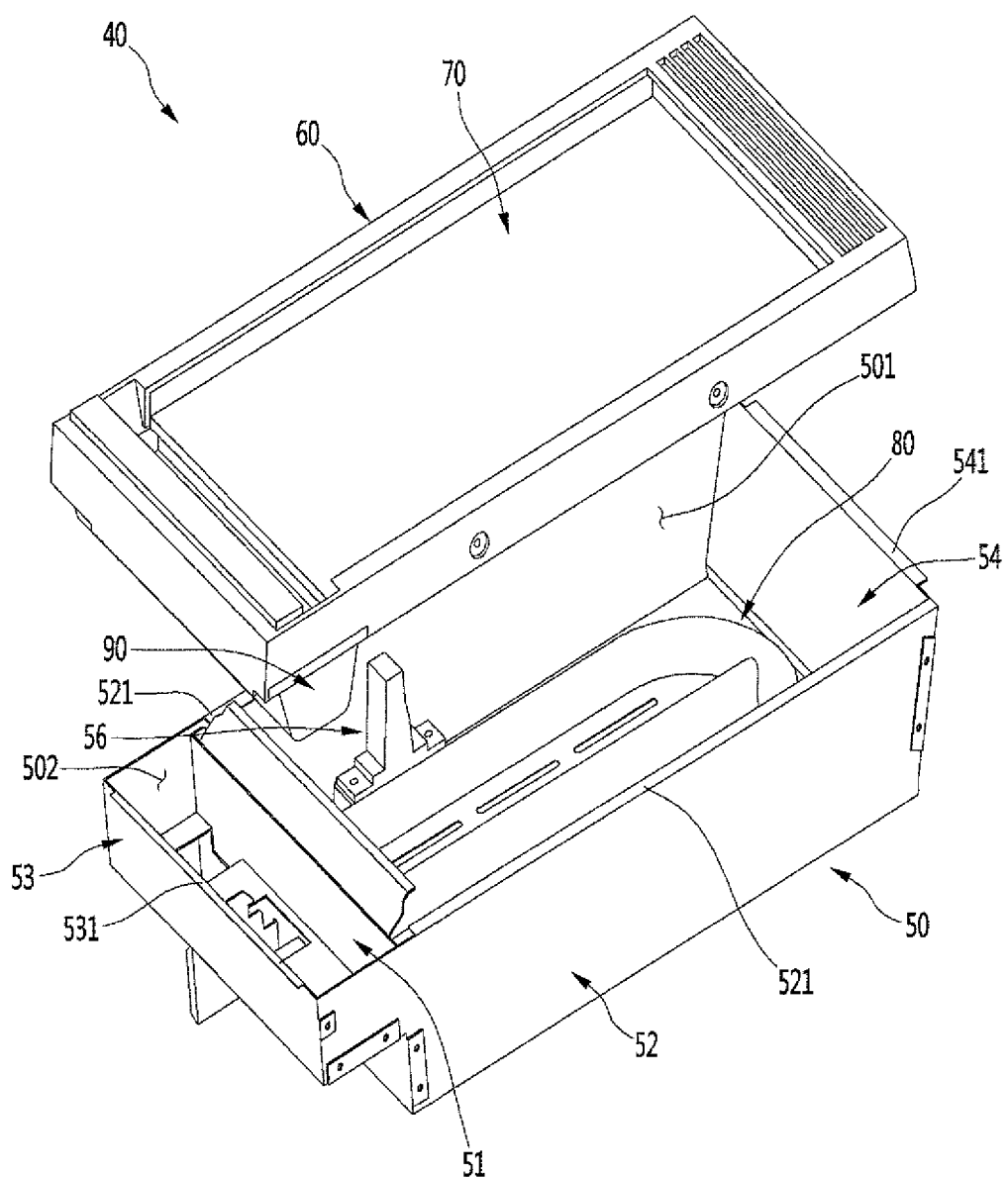
FIG. 6 is an exploded perspective of the griddle.
Figure 7:
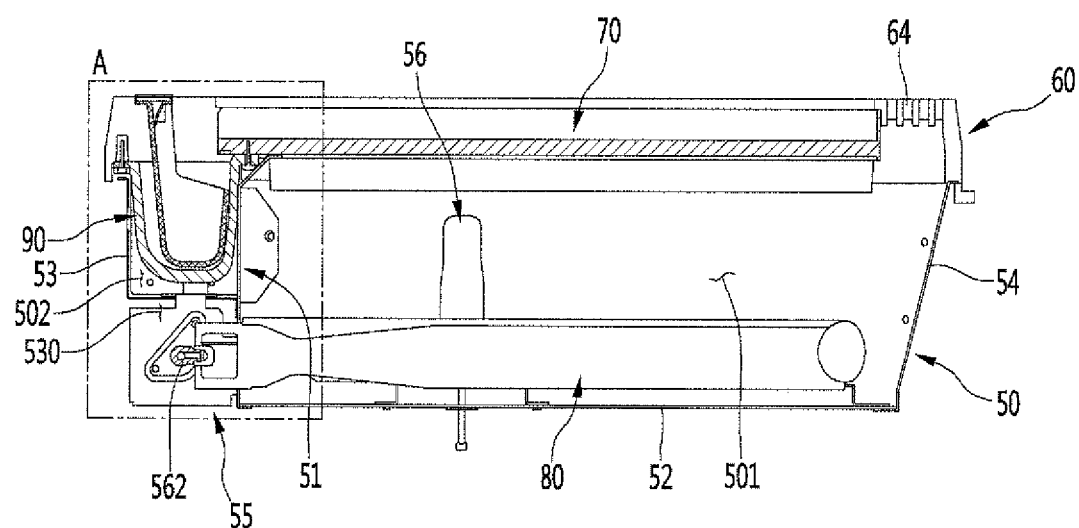
FIG. 7 is a cross-sectional view of the griddle.

FIG. 4 is a perspective view of the griddle when viewed from an upper side. Also, FIG. 5 is a perspective view of the griddle when viewed from a lower side. Also, FIG. 6 is an exploded perspective of the griddle. Also, FIG. 7 is a cross-sectional view of the griddle.

As illustrated in the drawings, the griddle device 40 may have a size that is enough to be mounted on the cooktop part 20 as a whole. The griddle device 40 may have a lower portion accommodated in the cooktop part 20 and an upper portion exposed to the outside to define a top surface of the cooktop part 20.

Also, the griddle device 40 may include a housing 50 defining a space in which the burner 80 and the like are accommodated, the heating plate 70 heated by the burner 80, and the frame 60 defining a circumference of the heating plate 70.

The griddle device 40 may include the housing 50, the heating plate 70, and the frame 60. The griddle device 40 may be mounted on the cooking apparatus 1 to constitute one component of the cooking apparatus 1. Alternatively, the griddle device 40 may have a structure that is mounted on a separate case (not shown). Also, the griddle device 40 may be used as an independent cooking apparatus that is capable of separately independently mounted and used with respect to the cooking apparatus 1. Also, the griddle device 40 may have a built-in structure that is capable of being mounted on the cooking apparatus or furniture.

Hereinafter, a portion at which a vent part 64 of the griddle device 40 is disposed will be defined as a rear side, a portion at which a pocket part 90 is disposed will be defined as a front side, a bottom surface of the housing 50 will be defined as a lower side, and a top surface of the heating plate 70 will be defined as an upper side, and also, this structure will be described.

The housing 50 may have a box shape with an opened top surface and be inserted into the cooktop part 20. The burner 80 in which a supplied gas is burned may be provided in the housing 50. When the burner 80 is ignited, the heating plate 70 disposed at the upper side thereof may be heated.

The inside of the housing 50 may be partitioned into front and rear spaces by a barrier 51. The pocket part 90 may be disposed in the front space, and the burner 80 and the heating plate 70 may be disposed in the rear space.

A plurality of air holes 522 through which air for gas combustion is introduced may be defined in the bottom surface of the housing 50. Also, a front end of the housing 50 may be stepped. A gas valve 561 for supplying a gas to the burner 80 and a connection tube 562 connected to the burner 80 may be disposed in the stepped space.

The opened top surface of the housing 50 may be covered by the frame 60 in the state in which the heating plate 70 and the pocket part 90 are mounted. The frame 60 may define an outer appearance of an upper portion the griddle device 40, which is exposed to the outside, when the griddle device 40 is mounted.

The frame 60 may be coupled to a circumference of an upper end of the housing. 50. Also, the rear space of the housing 50 may be covered by the heating plate 70 mounted inside the frame 60, and the front space of the housing 50 may be covered by the pocket part 90.

Hereinafter, a structure of the housing 50 will be described in more detail with reference to the accompanying drawings.

Figure 8:
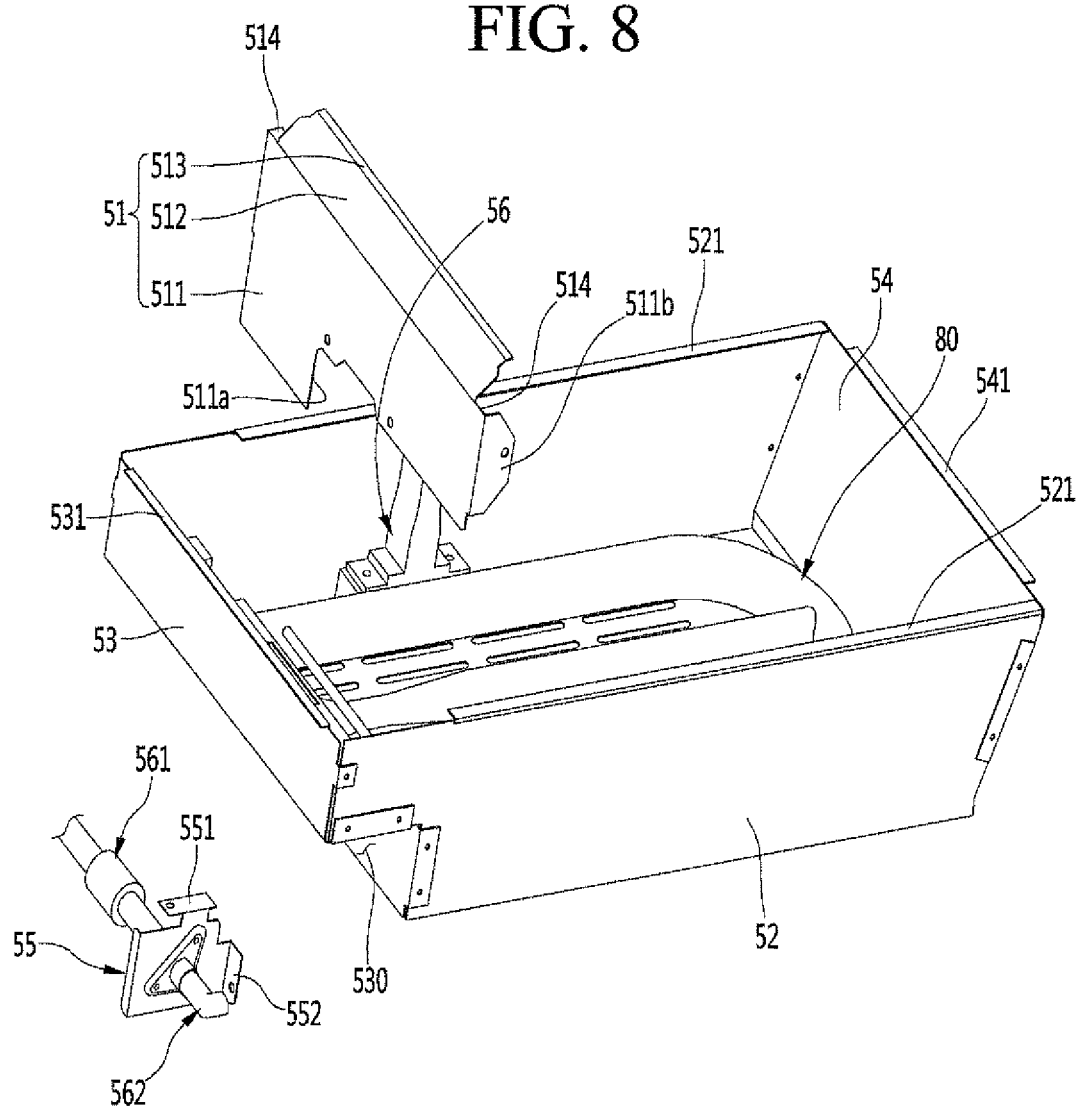
FIG. 8 is an exploded perspective view illustrating a state in which a barrier of a housing and a valve bracket are separated from each other when viewed from the upper side.
Figure 9:
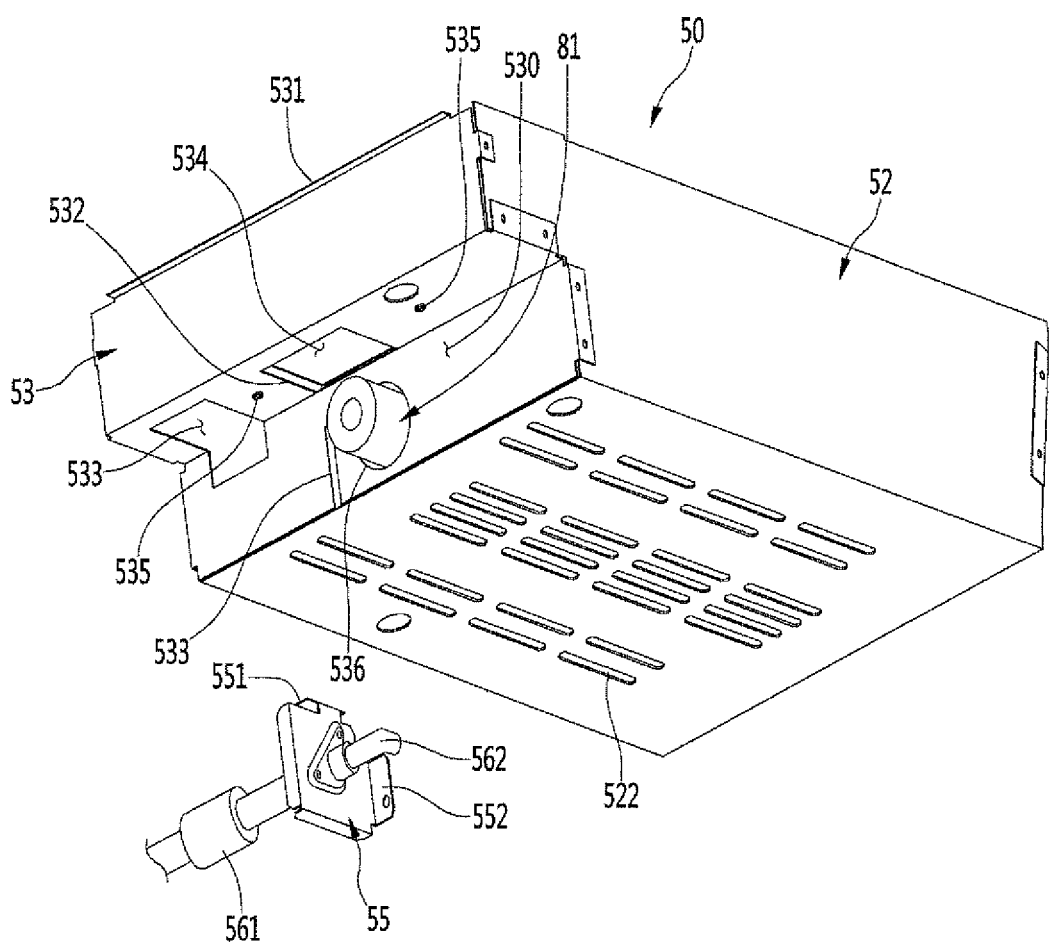
FIG. 9 is an exploded perspective view illustrating a state in which the valve bracket is separated when viewed from the lower side.
Figure 10:
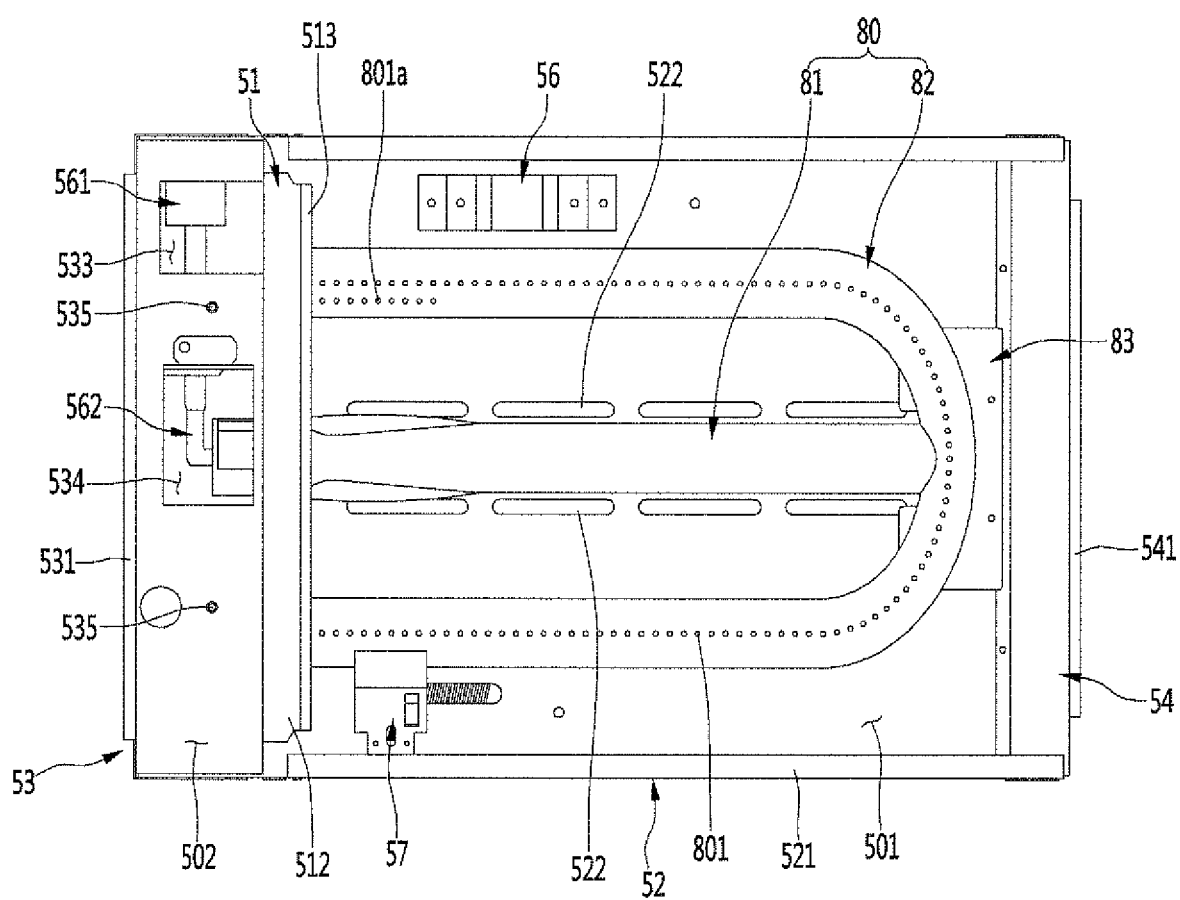
FIG. 10 is a plan view illustrating the inside of the housing.

FIG. 8 is an exploded perspective view illustrating a state in which the barrier of the housing and the valve bracket are separated from each other when viewed from the upper side. Also, FIG. 9 is an exploded perspective view illustrating a state in which the valve bracket is separated when viewed from the lower side. Also, FIG. 10 is a plan view illustrating the inside of the housing.

As illustrated in the drawings, the housing 50 may be made of a steel material having a plate shape and be bent to define a space having an opened top surface. Also, bent parts 521, 531, and 541 may be disposed on the upper end of the housing 50. Also, the frame 60 coupled to the heating plate 70 may be seated on the upper end of the housing 50.

The bent parts 521, 531, and 541 may include first bent parts 531 and 541 that respectively extend forward and backward from front and rear ends of the housing 50 and a second bent part 521 extending to inside of the housing 50 from each of both left and right ends of the housing 50.

The housing 50 may be provided by coupling a first plate 52 defining a bottom surface and both side surfaces of the heating space 501, a second plate 53 defining front and bottom surfaces of the insulation space 502 and a front surface of the heating space 501, and a third plate 54 defining a rear surface of the heating space 501.

Also, the inside of the housing 50 may be partitioned by the barrier 51. The barrier 51 may partition the inner space of the housing 50 into one space in which the burner 80 is accommodated and the other space in which the pocket part 90 that will be described below is accommodated. Here, the space in which the burner 80 is accommodated may be called the heating space 501 or the rear space in which the combustion of the burner 80 occurs. Since the pocket part 90 does not need to be heated and prevents heat of the heating space 501 from being transferred, the pocket part 90 may be called the insulation space 502 or the front space.

The insulation space 502 may be partitioned from the heating space 501 by the barrier 51. When the frame 60 and the heating plate 70 are mounted, the inside of the housing 50 may have the independent front and rear spaces with respect to the barrier 51. Thus, the transfer of heat generated when the combustion of the burner 80 occurs into the pocket part 90 within the insulation space 502 may be minimized.

In detail, the barrier 51 may have a plate shape and also have a size corresponding to a horizontal width of the inner space of the housing 50. Also, the barrier 51 may include a partition part 511 extending vertically from the bottom surface of the housing 50.

The partition part 511 may extend up to a height that is lower than a bottom surface of the heating plate 70. Also, a lower end of the partition part 511 may extend up to the bottom surface of the housing 50 or the bottom surface of the insulation space 502. Also, a barrier cutoff part 511a through which at least a portion of the burner 80 is accessible may be provided in a lower portion of the partition part 511. A barrier fixing part 511*b* that is bent may be disposed on each of both ends of the partition part 511. The barrier fixing part 511*b* may be fixed to each of both side surfaces of the housing 50 so that the barrier 51 is maintained in the mounted state.

An inclined part 512 may be provided on an upper end of the partition part 511. The inclined part 512 may extend to the heating plate 70 and be inclined backward from the front side to the rear side. Here, an upper end of the inclined part 512 may extend up to a height higher than the bottom surface of the heating plate 70.

The partition part 511 may have a horizontal width less than the inclined part 512. Thus, a barrier stepped part 514 may be disposed on each of both ends of the partition part 511. The barrier stepped part 514 may be restricted with an inner surface of the frame 60.

Also, a contact part 513 bent to contact the heating plate 70 may be disposed on the upper end of the inclined part 512. Thus, when the heating plate 70 is mounted, the contact part 513 may contact the bottom surface of the heating plate 70, and the inclined part 512 may be pressed to be deformed somewhat downward. That is, an upper end of the barrier 51 may be closely attached to the bottom surface of the heating plate 70 in the pressed state. Thus, the heat generated when the combustion of the burner occurs inside the heating space 501 may be completely blocked by the barrier 51 to prevent the heat from being transferred into the insulation space 502 through the gap between the heating plate 70 and the barrier 51.

Figure 22:
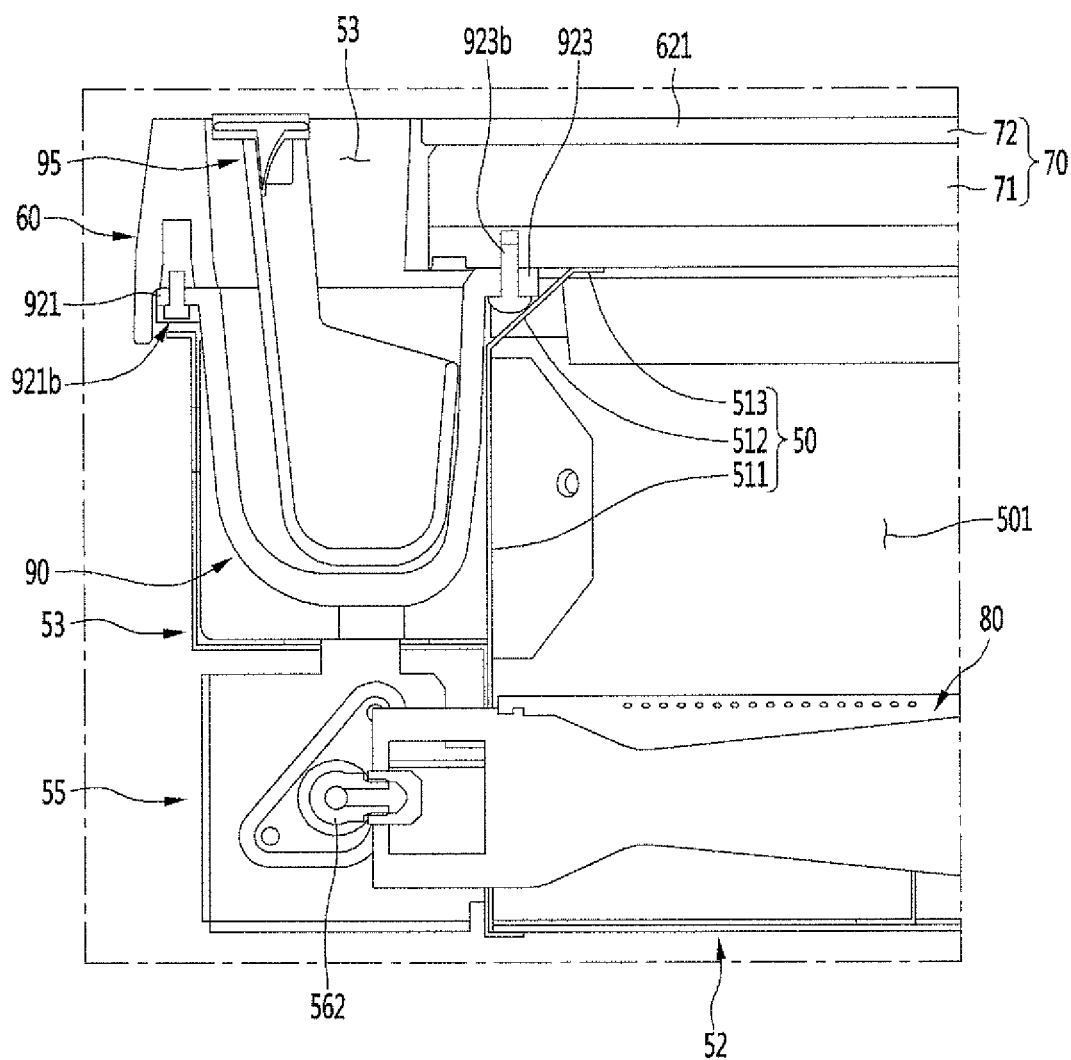
FIG. 22 is an enlarged view of a portion A of FIG. 7.

Also, the upper end of the barrier 51 may be disposed further behind the front end of the heating plate 70. The inclined part 512 and the contact part 513 may contact a portion that is away from the front end of the heating plate 70. Also, as illustrated in FIG. 22, the inclined part 512 may provide a space when being coupled to the pocket part 90 so that the inclined part 512 does not interfere with a rear part 923 of the pocket part 90 and the coupling member 923*b* coupled to the rear part 923.

The insulation space 502 may have a depth less than that of the heating space 501. Thus, the heating space 501 and the insulation space within the housing 50 may be stepped.

Thus, a space in which a gas valve 561 and a connection tube 562 connecting the gas valve 561 to the burner 80 are disposed may be defined in the front end of the housing 50. Thus, this space may be called a valve installation space 530. The gas valve 561 and the connection tube 562 may be disposed in a lower side of the insulation space 502 and a front side of the heating space 501 and be fixed to an outer surface of the housing 50 by a separate valve bracket 55.

The valve bracket 55 may have a plate shape so that the gas valve 561 or the connection tube 562 passes therethrough. Thus, the gas valve 561 and the connection tube 562 may be in a state of being fixed to the valve bracket 55. Also, a bent upper bent part 551 and a bent rear bent part 552 may be disposed on upper and lower ends of the valve bracket 55, respectively.

The upper bent part 551 may be coupled by a separate coupling member and thus fixed in a state in which the upper bent part 551 is inserted into a first opening 532 defined in the bottom surface of the insulation space 502. Also, the rear bent part 552 may be coupled by a separate coupling member and thus fixed in a state in which the rear bent part 552 is inserted into a second opening 533 defined in the front surface of the heating space 501.

Also, the gas valve 561 and the connection tube 562 may be coupled to each other in a screw coupling manner. A first connection opening 533 may be defined in the bottom surface of the insulation space at a portion corresponding to the portion at which the gas valve 561 and the connection tube 562 are connected to each other. Thus, the gas valve 561 and the connection tube 562 may be connected to each other through the first connection opening 533, or the connection between the gas valve 561 and the connection tube 562 may be confirmed through the first connection opening 533.

Also, a second connection opening 534 may be defined in the bottom surface of the insulation space 502 at a portion corresponding to the portion at which the other end of the connection tube 562 and an end of the burner 80 are connected to each other. The burner 80 and the connection tube 562 may be connected to each other through the second connection opening 534, or the connection between the burner 80 and the connection tube 562 may be confirmed through the second connection opening 534.

Also, a coupling hole 535 to which a coupling member 93 coupled by passing through the pocket part 90 is coupled may be further provided in the bottom surface of the insulation space 502.

A burner hole 536 may be defined in a center of the front surface of the heating space 501. A rear end of the burner 80, more particularly, a mixing tube 81 of the burner 80 may be connected to the connection tube 562.

The burner 80 may include the mixing tube 81 in which a fuel gas and air are mixed with each other at a center thereof and a burner body 82 having a "U" shape, which is connected to the mixing tube 81. The mixing tube 81 may be connected to a central portion of the burner body 82, and the mixed gas of the fuel gas and the air, which is introduced into the central portion of the burner body 82 may be supplied along the burner body 82.

The burner body 82 may have a size that is enough to be filled into the most region of the heating space 501 and be configured to uniformly heat the heating plate 70.

Also, an air hole 522 may be defined in the bottom surface of the housing 50, which corresponds to the burner body 82 and the mixing tube 81. Oxygen that is necessary for the combustion of the burner 80 may be supplied through the air hole 522. The air hole 522 may be defined vertically below the burner body 82 and the mixing tube 81. When viewed from the upper side, the air hole may be exposed to the outside by being covered by the burner body 82 and the mixing tube 81. Also, to prevent user's finger from being injured during the operation, the air hole 522 may be provided as a plurality of hole shapes, each of which has a long length and a narrow width.

A temperature measurement device 56 for measuring a temperature of the heating plate 70 may be disposed at one side of each of both sides of the burner 80. The gas valve 561 may be opened or closed according to the temperature measured by the temperature measurement device 56, and also, the measured temperature may be displayed by an external device so as to be confirmed by the user.

Also, an igniter 57 may be disposed at the other side of the burner 80. The igniter 57 may be configured to ignite the burner 80. Here, the igniter 57 may heat the burner so that the fuel gas discharged from a flame hole defined along the body of the burner 80 is ignited.

The igniter 57 may radiate high-temperature heat in a state in which the gas valve 561 is opened to ignite the fuel gas. Also, in the state in which the gas valve 561 is opened, the operation of the gas valve 561 may be continuously maintained to be heated. Thus, immediate and continuous re-ignition may be possible even in the event of temporary ignition failure.

The flame hole 801 may be continuously defined along a center of the top surface of the burner body 82. The combustion may occur in the mixed gas injected through the flame hole 801 may generate flame. The generated flame may heat the heating plate 70 at a lower side of the heating plate 70.

Here, a flame hole 801a may be further defined in a position of the flame hole 801, which is opposite to the igniter 57, in one end of the burner body 82 corresponding to the temperature measurement device 56. For example, when the flame holes 801 are defined in a first row along the burner body 82 over the entire burner body 82, the flame holes 801a may be defined in a second row at the position opposite to the igniter 57. Thus, the heating plate 70 may be heated at a temperature corresponding to a temperature generated when the igniter 57 operates.

That is, the flame hole 801 may be further defined at the corresponding temperature at the opposite position so that the heating plate 70 is locally heated at a high temperature by the operation of the igniter 57. In addition, the number of flame holes 801 may be adequately selected according to the heating temperature of the igniter 57.

A mixing tube 81 passing through the front end of the burner 80, i.e., the heating space 501 to extend backward may be supported by the housing 50. Also, the rear end of the burner 80, i.e., a bent central portion of the burner body 82 within the heating space 501 may be supported to be spaced apart from the bottom surface of the housing 50 by the burner bracket 83.

The frame 60 may be seated along a circumference of the opened top surface of the housing 50. Here, the frame 60 may be maintained in a state of being stably supported by the first and second bent parts 531, 541, and 521 of the upper end of the housing 50.

Hereinafter, structures of the frame 60 and the constituents coupled to the frame 60 will be described with reference to the accompanying drawings.

Figure 11:
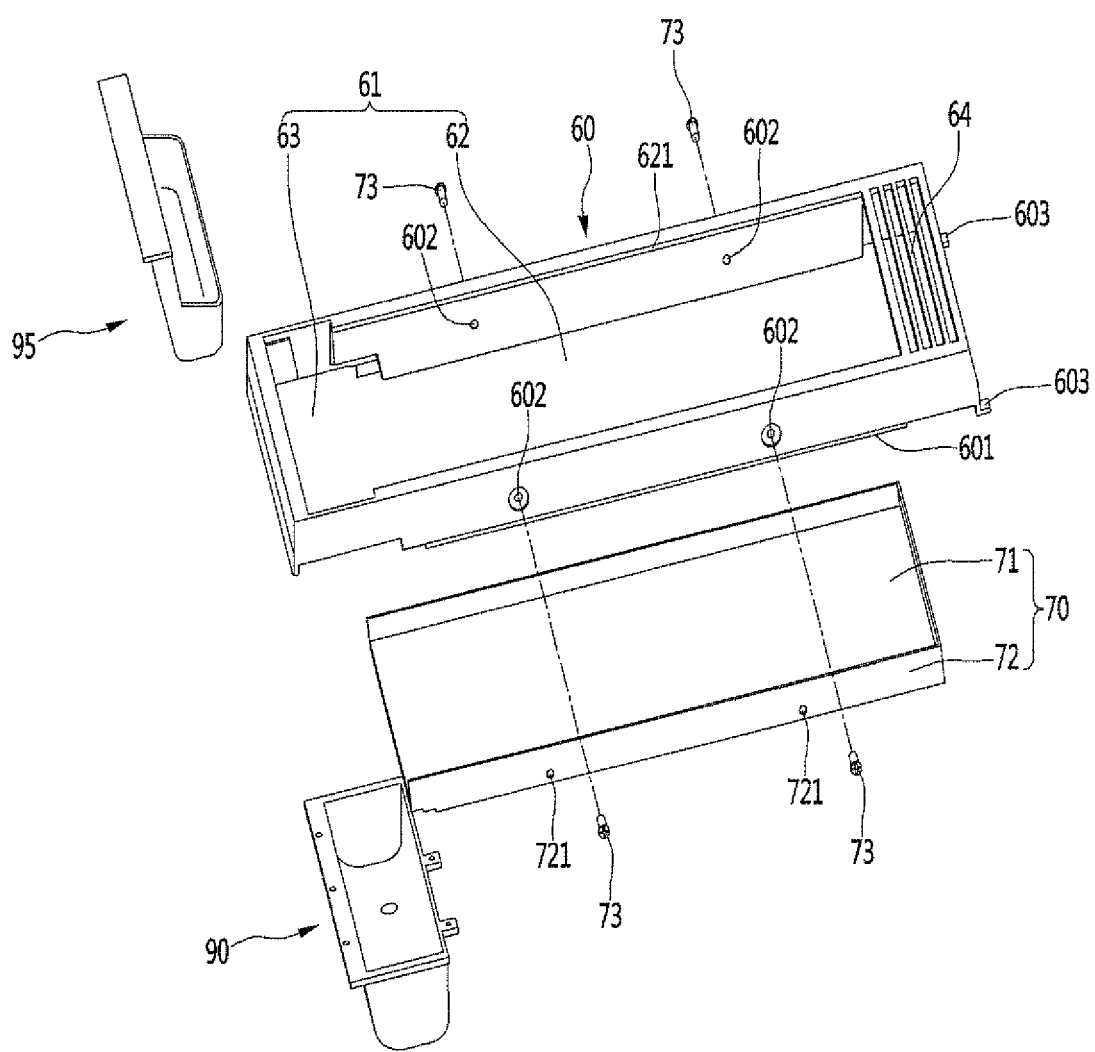
FIG. 11 is an exploded perspective view illustrating a coupling structure of the frame, a heating plate, a pocket part, and a pocket tray when viewed from the upper side.
Figure 12:
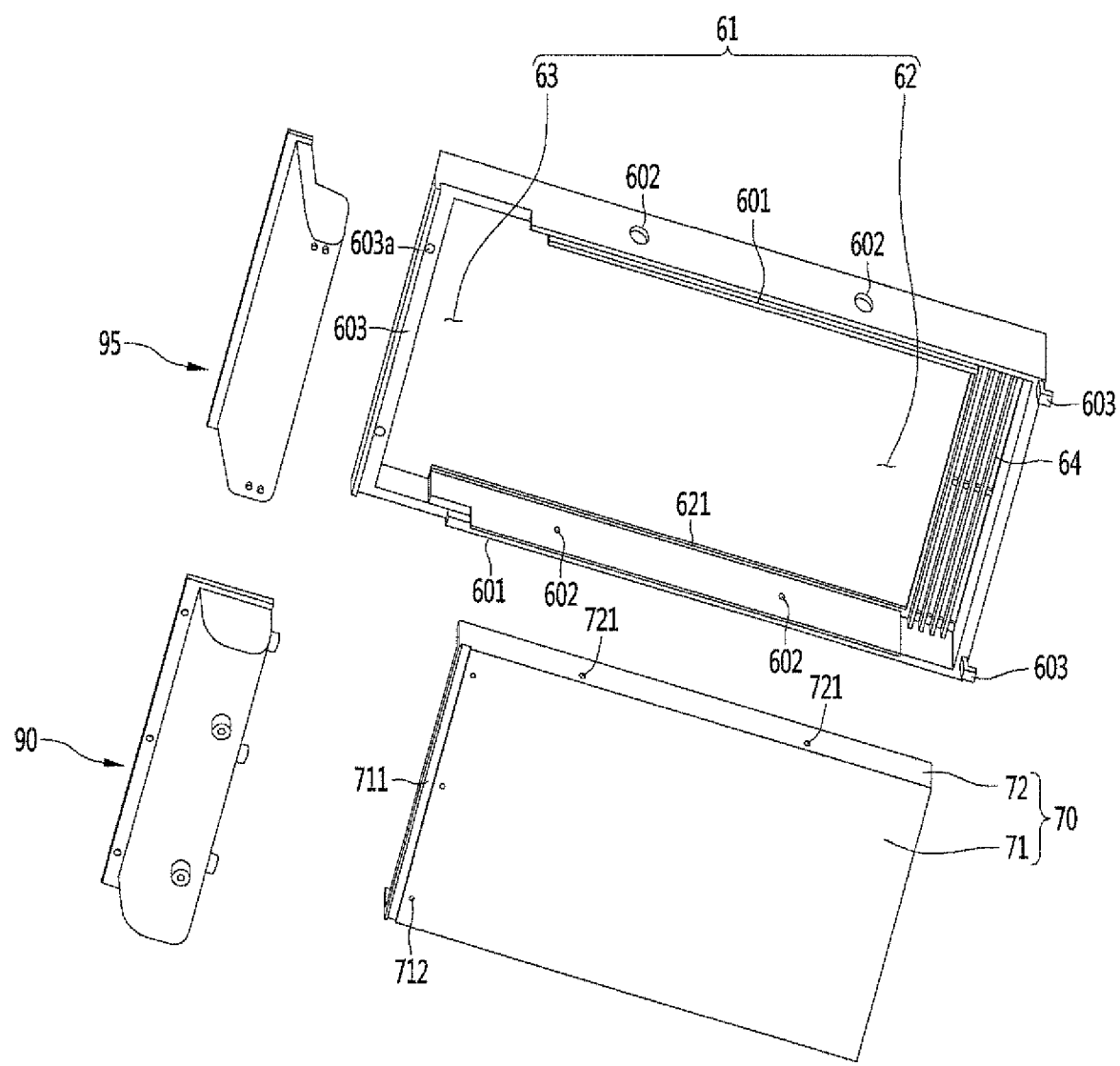
FIG. 12 is an exploded perspective view illustrating a coupling structure of the frame, the heating plate, the pocket part, and the pocket tray when viewed from the lower side.

FIG. 11 is an exploded perspective view illustrating a coupling structure of the frame, the heating plate, the pocket part, and the pocket tray when viewed from the upper side. Also, FIG. 12 is an exploded perspective view illustrating a coupling structure of the frame, the heating plate, the pocket part, and the pocket tray when viewed from the lower side.

As illustrated in the drawings, the frame 60 may be seated on the top surface of the housing 50. A frame opening 61 may be defined in a center of the frame 60. The frame 60 may include a front pocket mounting part 63 and a plate mounting part 62 remaining except for the pocket mounting part 63. Thus, a structure in which the heating plate 70 and a pocket part 90 are mountable may be provided in the frame opening 61 to define an outer appearance of a circumference of a top surface of the griddle device, which is exposed to the outside. The frame 60 may be made of the same cast iron material as the grating 31 used in the gas stove 30. The frame 60 may be cast to have the same texture. Thus, the frame 60 may be structurally limited due to the limitation of the structure and the molding method of the molding frame.

Also, the frame 60 may provide a support surface seated on a case (not shown) defining an outer appearance thereof. When the frame 60 is mounted on the cooktop part 20 in a module type, the frame 60 may be detached in the module type.

In detail, when the griddle device 40 is mounted on the cooktop part 20 in the module type, the bottom surface of the housing 50 may be seated on a mounting bracket 202 disposed therebelow and be coupled by a coupling member such as a screw. The mounting bracket 202 may be fixed inside the cooktop part 20 and support the griddle device 40 at the lower side.

Also, the mounting bracket 202 may be further fixed to the cooking apparatus 1 or the other side of the cooktop part 20 by a screw that sequentially passes through the pocket part 90 and the housing 50.

Furthermore, an installation protrusion 603 inserted into an installation hole defined in a rear support 203 of the cooktop part 20 may protrude from a rear end of the frame 60. A front end of the frame 60 may have a shape corresponding so that the frame 60 is seated on a seating part that is disposed to be stepped on the front support 204 of the cooktop part 20.

Also, a side seating part 601 may be further disposed on a bottom surface of each of both left and right ends of the frame 60. A side deco (not shown) may be disposed on the side seating part 601. The side deco may cover other cooking modules 2, which are successively disposed adjacent to the cooking apparatus, for example, a boundary that is adjacent to the gas stove 30, an inductor, a sous vide cooking device, and the like. Also, when the griddle device 40 is mounted, the side deco may be disposed on the side seating part 601 to prevent the griddle device 40 from interfering with the side deco.

A vent part 64 may be provided in the rear end of the frame 60. The vent part 64 may contact the rear end of the housing 50, which extends to be inclined. Also, the vent part 64 may be opened in a grill shape to exhaust the combustion gas generated inside the housing, i.e., the heating space 501.

Also, the heating plate 70 may be mounted on the frame 60. The heating plate 70 may be heated by the flame of the burner 80 and made of a metal material having superior thermal transfer performance. Also, the top surface of the heating plate 70 may be molded to be adequate for heating and cooking food through surface treatment such as coating.

The heating plate 70 may cover the remaining opened area of the frame 60 except for the pocket part 90 and the vent part 64. That is, both ends of the heating plate 70 may contact both ends of the frame opening 61. The rear end of the heating plate 70 may contact the vent part 64, and the front end of the heating plate 70 may extend up to a space in which the pocket part 90 is mounted.

The heating plate 70 may include a heating part 71 having a plate shape and providing a cooking surface to be heated and an edge part 72 extending vertically from a front end of the heating part 71 and each of both side ends of the heating part 71.

The heating part 71 may have a plate shape having a relatively thick thickness. When the heating part 71 is heated by the frame of the burner 80, the heating part 71 may have a thick thickness s that the entire surface of the heating part 71 have uniform temperature distribution. The heating part 71 may have a size corresponding to a size of the bottom surface of the heating space 501, i.e., a size that is enough to cover the upper side of the burner body 82. Thus, the entire surface of the heating part 71 may be uniformly heated by the ignition of the burner 80.

The heating part 71 is connected to a lower end of the edge part 72. Also, the heating part 71 may be disposed at a position that is lower than the top surface of the frame 60. When viewed from the upper side, the heating part 71 may cover most of the frame opening 61 except for the area on which the pocket part 90 is disposed.

Also, when the heating part 71 is mounted, the edge part 72 may define a shape of a side surface contacting the frame 60 and vertically extend to have a predetermined height. An upper end of the edge part 72 may contact the frame 60 to cover a space between the heating part 71 and the frame 60. The top surface of the heating part 71, i.e., a depth of the cooking space may be determined according to the height of the edge part 72.

A rear surface of the edge part 72 may contact a front end of the vent part 64, and both side surfaces of the edge part 72 may respectively contact both side surfaces of the frame 60. Also, a plate coupling hole 602 may be defined in each of both side surfaces of the frame 60. Also, a plate hole 721 may be defined in the edge part 72, which corresponds to the plate coupling hole 602. Thus, the coupling member 73 coupled to the plate hole by passing through the plate coupling hole 721 may be coupled through both the side surfaces of the frame 60. Thus, the heating plate 70 may be simply fixed and mounted on the frame 60 by the coupling member 73.

The edge part 72 may be configured to be coupled to the frame 60 and have a relative thin thickness so as to be coupled to the coupling member 73. The edge part 72 may have a thickness less than that of the heating part 71. Thus, the heating plate 70 may be provided by bonding the heating part 71 and the edge part 72, which have different thicknesses, through welding.

An opening protrusion 621, which protrudes inward, of the frame openings 61 of the frame 60 may be defined in an upper end of the plate mounting part 62. Also, the upper end of the edge part 72 may be closely attached to a bottom surface of the opening protrusion 621, and thus, both side surfaces and a rear surface of the space defined in an upper side of the heating part 71 may be substantially sealed with the frame 60. Thus, when the heating plate 70 is mounted, an upper end of the edge part 72 of the heating plate 70 may not be exposed but be covered by the opening protrusion 621.

Here, each of both side surfaces of the frame 60 may have a thickness that gradually increases upward, and each of both side surfaces of the frame opening 61 may be inclined due to characteristics of the molding of the frame 60 that is molded through casting using a mold.

The edge part 72 may not be disposed on the front end of the heating plate 70 and extend up to the pocket part 90. Thus, oil flowing down from the heating plate 70 or residue generated during the cooking may be introduced into the pocket part 90 through the front end of the heating plate 70.

The pocket mounting part 63 may be disposed on the front end of the frame opening 61. The pocket mounting part 63 may be covered by the pocket part 90 mounted therebelow. Also, both left and right sides of the pocket mounting part 63 may be recessed. Thus, in the frame opening 61, a stepped portion may be disposed between the pocket mounting part 63 and the plate mounting part 72 on which the heating plate 70 is mounted.

The pocket part 90 may be mounted on the pocket mounting part 63. The pocket part 90 may be fixed and mounted on the frame 60 and provide a space that is recessed inward. A pocket tray 95 for collecting the foreign substance or the oil, which flows down from the heating plate 70, may be accommodated in the pocket mounting part 63. The pocket tray 95 may be detachable without having a separate restricting structure. That, the pocket tray 95 may empty the foreign substance and oil when desired by the user. In the state in which the heating plate 70 and the pocket part 90 are mounted on the frame 60, when the frame 60 is coupled to the housing 50, the opened top surface of the housing 50 may be completely covered.

Hereinafter, structures of the frame 60 and the constituents coupled to the frame 60 will be described with reference to the accompanying drawings.

Figure 13:
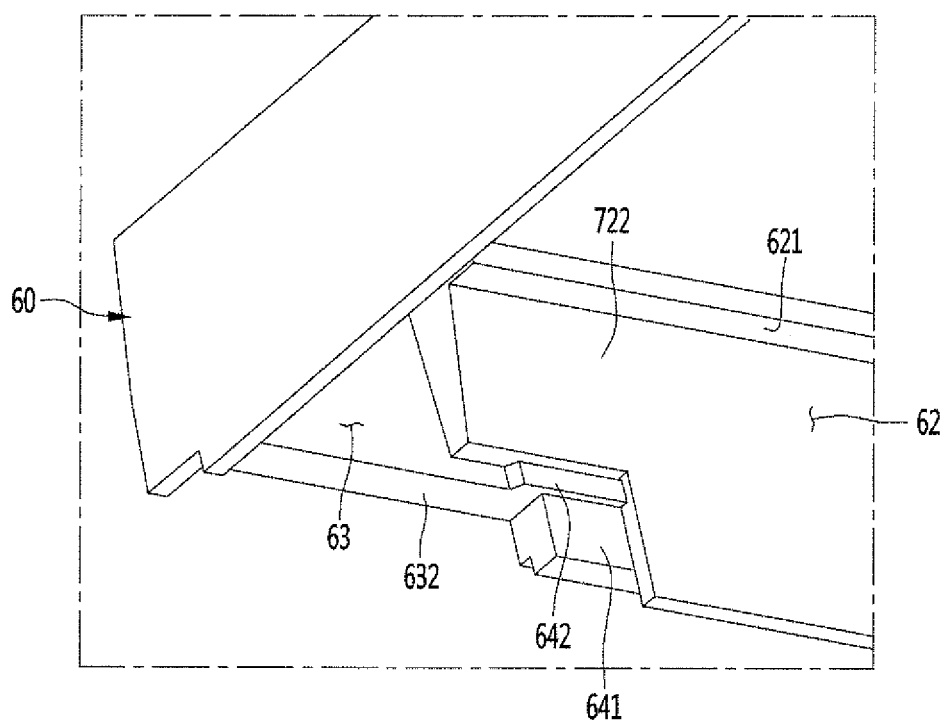
FIG. 13 is a partial perspective view illustrating a main part of the frame.
Figure 14:
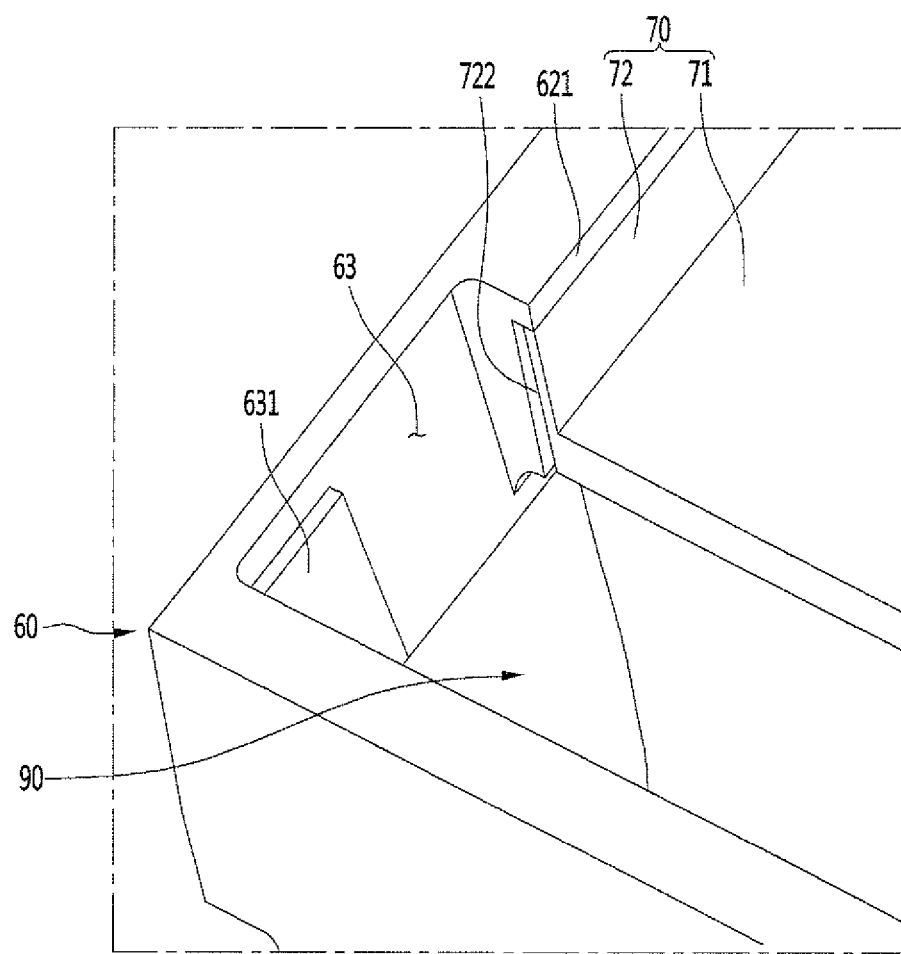
FIG. 14 is a partial perspective view illustrating a coupling state of the frame, the heating plate, and the pocket part.
Figure 15:
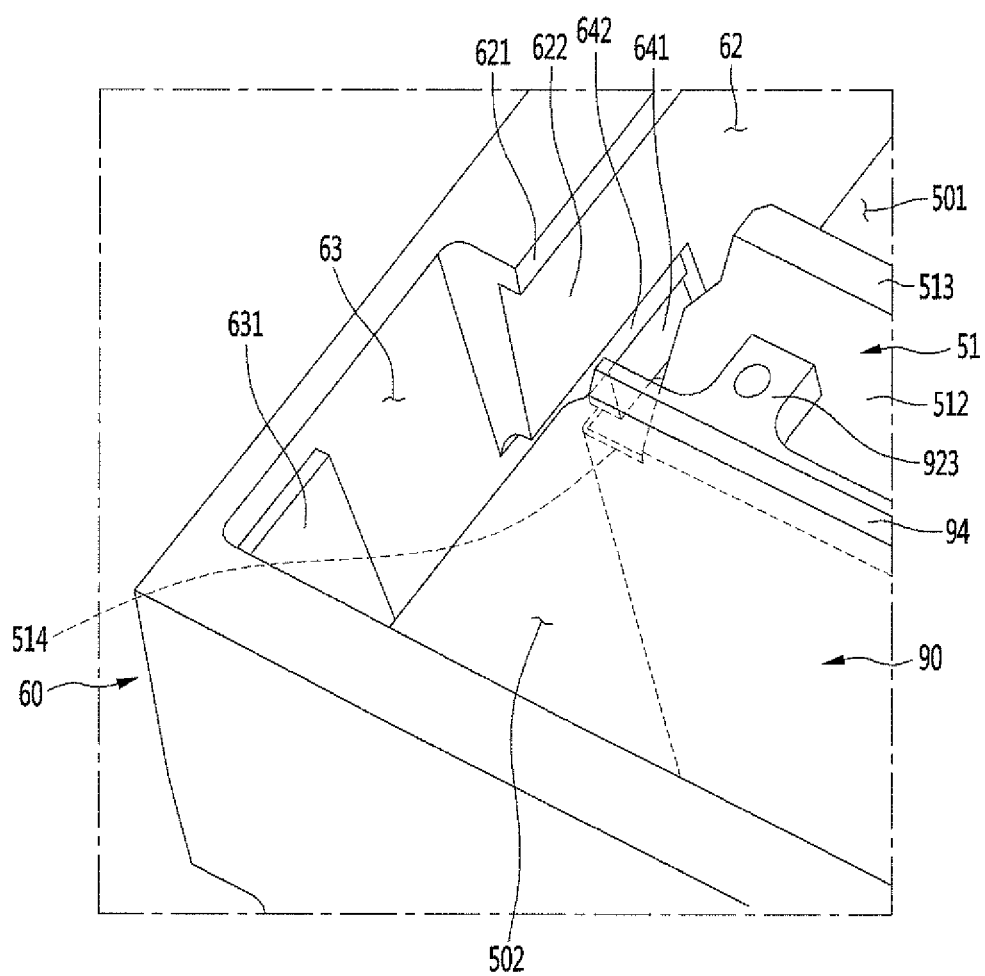
FIG. 15 is a projective view illustrating a state in which the heating plate is separated in FIG. 14.
Figure 16:
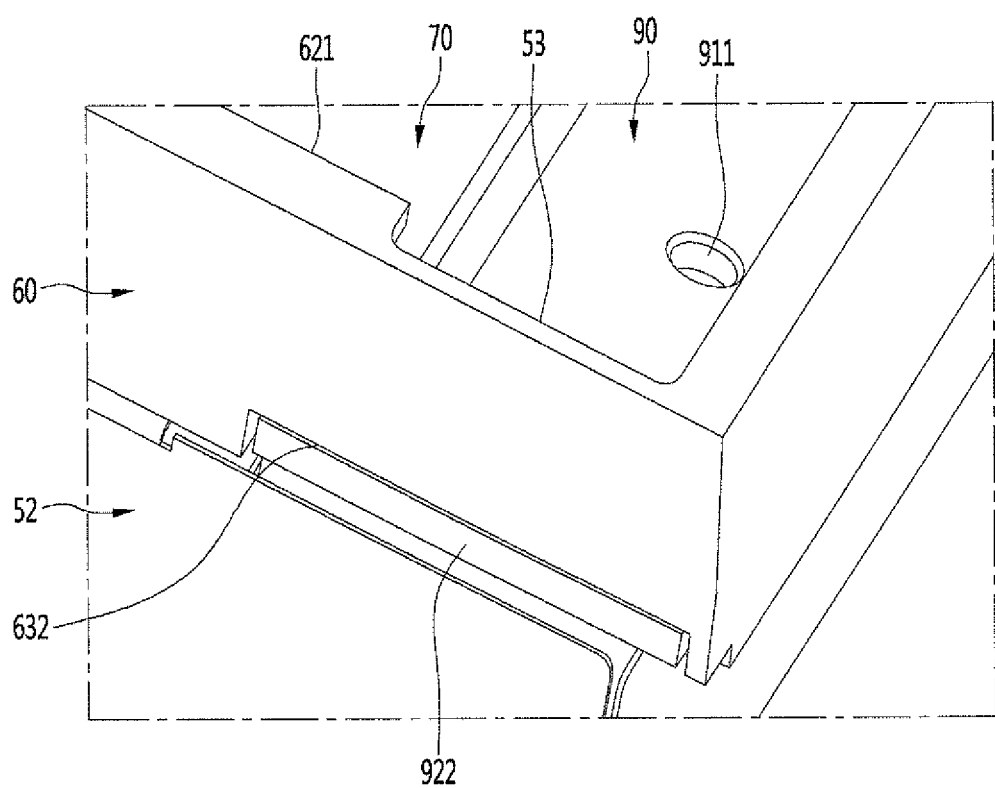
FIG. 16 is a partial perspective view illustrating a coupling state of the frame and the pocket part.
Figure 17:
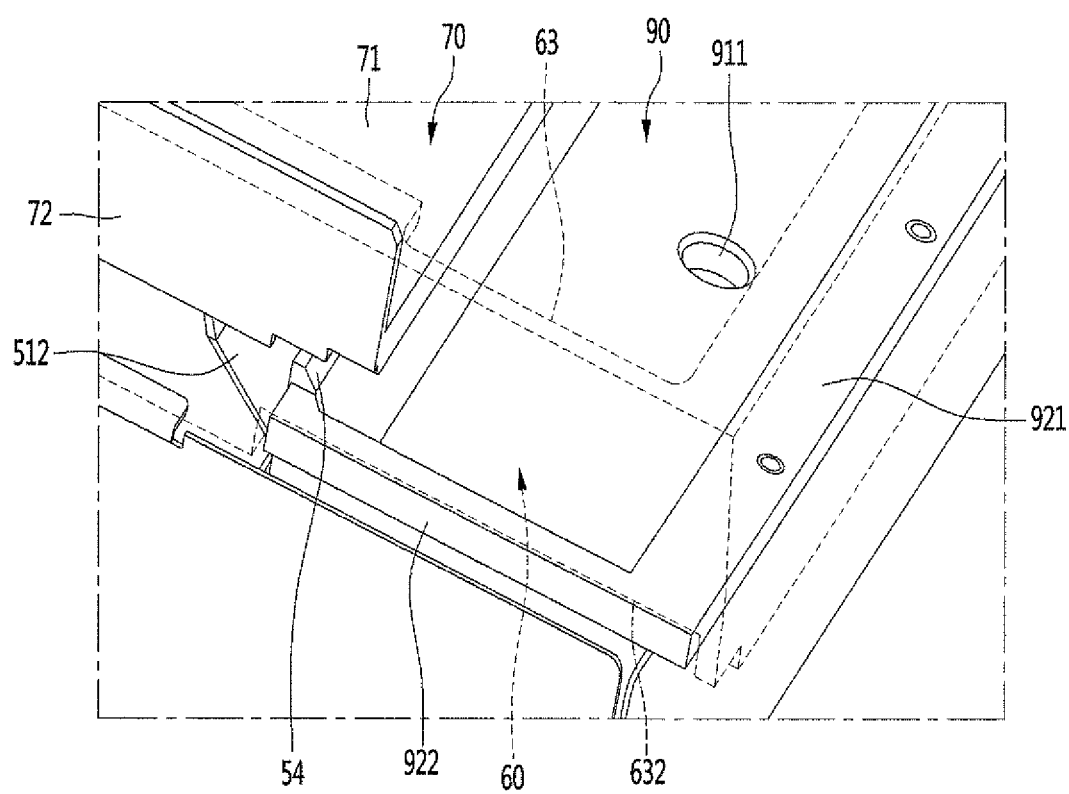
FIG. 17 is a projective view of the frame of FIG. 16.

FIG. 13 is a partial perspective view illustrating a main part of the frame. Also, FIG. 14 is a partial perspective view illustrating a coupling state of the frame, the heating plate, and the pocket part. Also, FIG. 15 is a projective view illustrating a state in which the heating plate is separated in FIG. 14. Also, FIG. 16 is a partial perspective view illustrating a coupling state of the frame and the pocket part. Also, FIG. 17 is a projective view of the frame of FIG. 16.

As illustrated in FIG. 13, all of the heating plate 70, the barrier 51, and the pocket part 90 may be disposed on a front portion of both left and right sides of the inside of the frame opening 61, and these constituents may be coupled to each other without interfering with each other.

The pocket mounting part 63 may be recessed from each of both sides of an inner surface of the frame 60. Also, a tray seating part 631 may be disposed on the front end of the inside of the pocket mounting part 63. Also, an accommodation groove 632 may be defined in a lower end of the pocket mounting part 63. Also, the plate mounting part 72 may protrude inward from the lower end of the pocket mounting part 63. A first stepped part 641 and a second stepped part 642 may be vertically sequentially disposed on a lower portion of the front end of the plate mounting part 72.

When this structure is described in more detail with reference to FIGS. 14 to 17, the front end of the heating plate 70 may extend to the pocket mounting part 63 and also be disposed further behind both recessed left and right sides of the pocket mounting part 63. Thus, the vertical front end of the edge part 72 of the heating plate 70 and the stepped front end of the inclined side surface 722 of the plate mounting part 72 may not coincide with each other and be respectively disposed at front and rear sides. When viewed from the front side, a gap between the inclined inner surface of the plate mounting part 72 and the edge part 72 of the heating plate 70 may not be visibly emphasized due to this structure, and the space between the inner surface of the plate mounting part 72 and the edge part 72 may not be visible.

That is, the inner surface of the plate mounting part 72 may be inclined to facilitate the separation of the mold when the casting molding of the frame 60. Also, deterioration of the outer appearance due to the excessive exposure of the gap between the frame 60 and the heating plate 70 when the heating plate 70 is coupled may be prevented.

The tray seating part 631 on which the pocket tray 95 accommodated in the pocket part 90 is seated may be disposed on the upper end of the pocket mounting part 63. The tray seating part 631 may protrude from the front end of the inside of the pocket mounting part 63 and be disposed lower somewhat than the upper end of the pocket mounting part 63. Thus, when the pocket tray 95 is seated on the pocket mounting part 63, the top surface of the pocket tray 95 and the top surface of the frame 60 may be disposed on the same plane.

Also, accommodation groove that is recessed upward may be defined in the lower end of the pocket mounting part 63. When the pocket part 90 is mounted, left and right side parts 922 of the pocket part 90 may be accommodated in the accommodation groove 632. The accommodation groove 632 may have a size corresponding to each of both left and right side ends of the top surface of the pocket part 90. When the pocket part 90 is accommodated and mounted in the accommodation groove 632, the pocket part 90 may be disposed in position, and holes 911, 921*a*, and 923*a* for fixing and mounting the pocket part 90 may be aligned with each other.

The pocket part 90 may provide a pocket accommodation part 91 having an opened top surface and recessed downward. A pocket edge 92 protruding outward along a circumference of the upper end of the pocket part 90 may be provided. The pocket part 90 may be constituted by a front part 921, a rear part 923, and side parts 922 disposed on both left and right sides. The front part 921, the rear part 923, and the side parts 922 may be coupled to the frame 60 and the heating plate 70.

In detail, the front part 921 of the pocket edge 92 may be coupled to a front coupling part 603 disposed on a bottom surface of the front end of the frame 60. Here, a plurality of front holes 921*a* may be defined in the front part 921, and a corresponding hole 603*a* may be defined in the bottom surface of the front end of the frame 60. Also, the coupling member 921*b* may be sequentially coupled to the front hole 921*a* and the hole 603*a* of the frame 60. Thus, the front end of the pocket part 90 may be fixed to the front end of the frame 60 by the coupling of the coupling member 921*b*.

The rear part 923 of the pocket part 90 may pass through a rear end of the pocket mounting part 63 to extend up to the plate mounting part 72. The rear part 923 may contact the bottom surface of the heating plate 70. Also, a rear surface coupling hole may be defined in the rear part 923. The coupling member may pass from a lower side to the rear surface coupling hole 293*b* and then be coupled to a hole 712 defined in the bottom surface of the heating plate 70. That is, the rear end of the pocket part 90 and the heating plate 70 may be coupled to each other by the coupling member.

That is, the front and rear ends of the pocket part 90 may be fixed to the frame 60 and the heating plate 70, respectively. Also, the pocket mounting part 63 may be covered by the pocket part 90, and also, the front end of the frame 60 and the heating plate 70 may be connected to each other by the pocket part 90.

The side parts 922 of the pocket part 90 may be accommodated in accommodation grooves 632 defined in both lower ends of the pocket mounting part 63, respectively. Each of the side parts 922 may have a shape corresponding to each of the accommodation grooves 632. Thus, the pocket part 90 may be disposed in position by the coupling of the accommodation groove 632 and the side part 922, and thus, the holes 911, 921*a*, and 923*a* may be aligned with each other. Also, both left and right ends of the pocket part 90 may be restricted by the accommodation grooves 632, and thus, the pocket part 90 may be maintained in the more stably mounted state.

The first stepped part 641 and the second stepped part 642 may be vertically continuously disposed on the lower ends of both side surfaces contacting the pocket mounting part 63. The first and second stepped parts 641 and 642 may be disposed further behind the front end of the heating plate 70 so as to be covered when the heating plate 70 is mounted.

Also, the first stepped part 641 may be disposed on a rear end of the accommodation groove 632. When the barrier 51 is mounted, both side ends of the bent inclined part 512 of the barrier 51 may be disposed on the first stepped part 641. Thus, the position of the inclined part 512 of the barrier 51 may be accurately maintained. When the heating plate 70 is mounted, even though the heating plate 70 presses the barrier 51, the barrier 51 may not be separated or excessively bent, and thus, the upper end of the barrier 51 may be closely attached to the bottom surface of the heating plate 70.

The lower end of the first stepped part 641 may contact an upper end of a partition part 511 of the barrier 51 to restrict upward movement of the barrier 51. Also, the upper end of the partition part 511 may have a width less than that of the inclined part 512. Thus, a stepped space may be defined between the partition part 511 and the inclined part 512, and the first stepped part 641 may be disposed in the space between the partition part 511 and the inclined part 512.

Also, the second stepped part 642 may be disposed above the first stepped part 641 and protrude further inward than the first stepped part 641. A pocket inclined part 94 protruding from the upper end of the pocket part 90 may be disposed on the second stepped part 642. When the pocket part 90 is mounted, the pocket inclined part 94 may be disposed on the second stepped part 642, and an upper end of the pocket inclined part 94 may be restricted by the inner surface of the frame 60 and the stepped portion provided by the second stepped part 642. Thus, the accurately mounted position of the pocket inclined part 94 may be maintained, and the pocket inclined part 94 may contact the bottom surface of the heating plate 70.

The inner surface of the frame 60, i.e., the inner surface of the plate mounting part 72 may further protrude inward than the second stepped part 642 above the second stepped part 642, and the edge part 72 of each of both side surfaces of the heating plate 70 may be disposed above the second stepped part 642.

The rear part 923 of the pocket part 90 may protrude backward from the upper end of the pocket part 90 and be provided in plurality at a certain interval. Also, the rear part 923 may contact the bottom surface of the heating plate 70 and be coupled to the heating plate 70.

In the state in which the pocket part 90 and the barrier 51 are mounted, when the heating plate 70 is mounted, the portions at which the pocket part 90 and the barrier 51 contact the frame 60 and the structures of the inner surface of the frame 60 for coupling may be covered. Thus, when viewed from the upper side, the constituents of the griddle device 40 may be simple to more improve the outer appearance.

Figure 18:
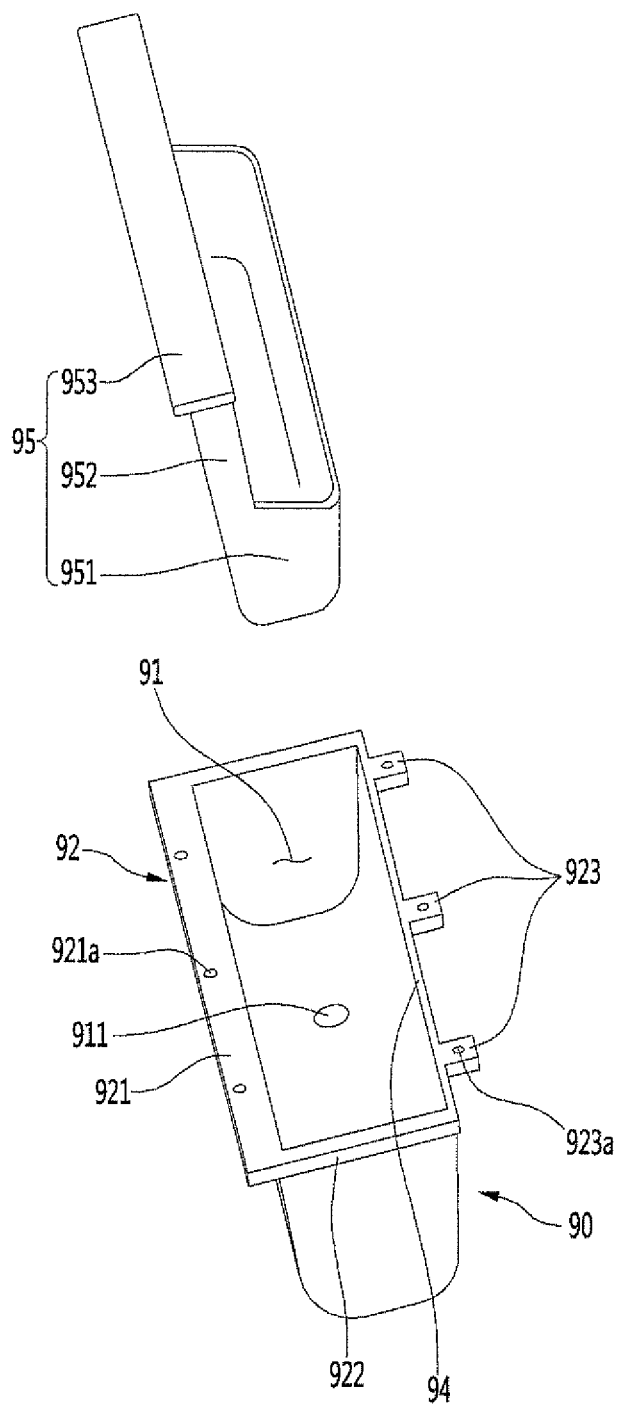
FIG. 18 is an exploded perspective view of the pocket part and the pocket tray when viewed from the upper side.
Figure 19:
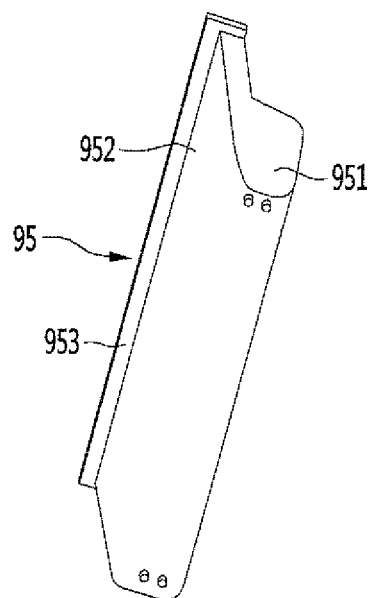
FIG. 19 is an exploded perspective view of the pocket part and the pocket tray when viewed from the lower side.
Figure 19:
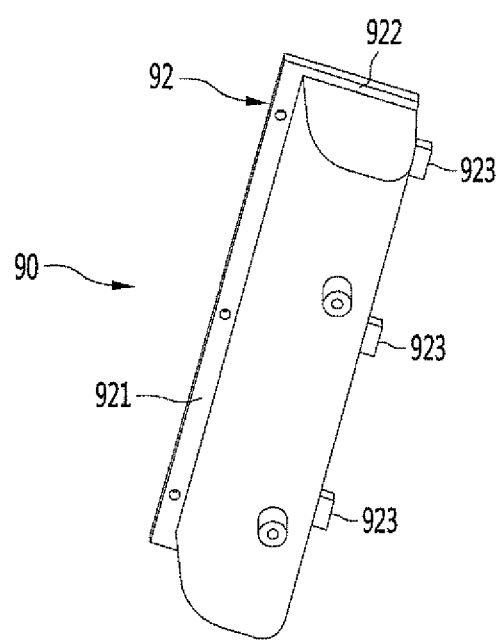

FIG. 18 is an exploded perspective view of the pocket part and the pocket tray when viewed from the upper side. FIG. 19 is an exploded perspective view of the pocket part and the pocket tray when viewed from the lower side.

As illustrated in the drawings, the pocket part 90 may have the same material as the frame 60 and be independently separately molded by the casting with respect to the frame 60. As necessary, the pocket part 90 may be made of an adequate metal material in a different molding method.

The pocket part 90 may have a size and shape that are capable of covering the lower side of the pocket mounting part 63. The pocket part 90 may include the pocket accommodation part 91 providing a space that is recessed downward and the pocket edge 92 that is bent outward from the upper end of the pocket accommodation part 91 as a whole.

The pocket accommodation part 91 may be recessed downward to define a space in which the pocket tray 95 is accommodated. Thus, the oil and the food waste flowing down during the cooking may be collected from the inside of the pocket accommodating part 91 and then discharged through the detachment of the pocket tray 95.

Figure 21:
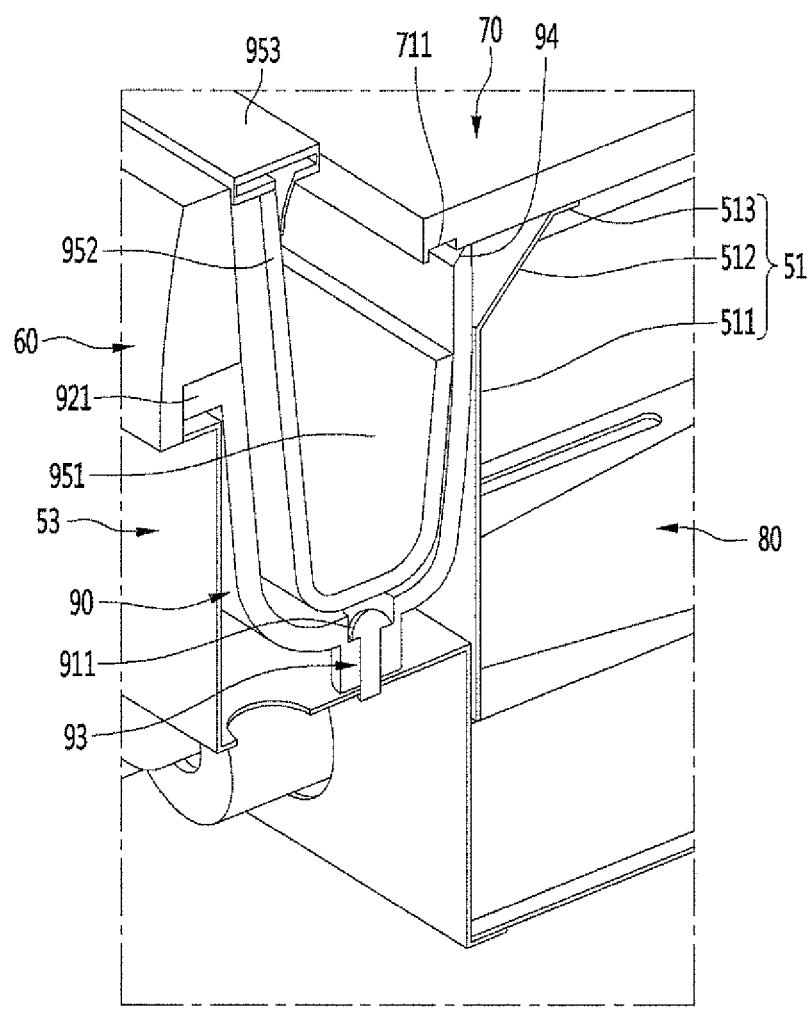
FIG. 21 is an enlarged view of a portion B of FIG. 20.

The recessed depth of the pocket accommodation part 91 may extend up to a bottom surface of the insulation space 502 or a position adjacent to the bottom surface of the insulation space 502. Thus, as illustrated in FIG. 21, the coupling member 93 passing through the coupling hole 911 defined in the bottom surface of the pocket accommodation part 91 may sequentially pass through the housing and then be coupled. The state in which the pocket part 90 is fixed to the housing 50 may be maintained by the coupling of the coupling member 93, and the heating plate 70 and the frame 60, which are fixed to the pocket part 90, may be integrally fixed. Thus, the coupling member 93 may be released to release the coupling of the pocket part 90 and the housing 50 so as to be separated from the housing 50. The coupling member 93 may be fixed and mounted on the case of the cooking apparatus 1 or the mounting bracket 202 of the cooktop part 20.

The pocket edge 92 may have a predetermined width outward along the opened upper end and be constituted by the rear part 923, the front part 921, and the side part 922.

Particularly, the rear part 923 may be disposed at a position corresponding to the inclined part 512 of the barrier 51, and the upper end of the pocket part 90 may be pressed to be coupled to the bottom surface of the heating plate 70 by the coupling of the coupling member 923b. Thus, the heating plate 70 and the pocket part 90 may be coupled to each other in the state of being completely closely attached to each other to prevent a gap from occurring therebetween. Thus, in addition to primary thermal blocking by the barrier 51, transfer of heat through the gap between the heating plate 70 and the pocket part 90 into the pocket part 90 may be prevented.

The rear part 923 may be disposed along the rear end of the pocket accommodation part 91 as a whole. Also, the rear part 923 may further extend backward at only a position in which the coupling hole 923a is defined.

The pocket part 90 may be ignited at the time of an occurrence of heat transfer due to the use characteristics in which the oil is collected. Thus, the pocket part 90 may have an effect of preventing fire due to such a thermal blocking structure.

In the griddle having the structure in which the pocket part is integrally cost and molded with the frame, but having the structure according to an embodiment, a pressing contact structure between the heating plate and the upper end of the pocket part may not be provided. Thus, heat in the heating space may be transferred into the pocket part. This may be caused by surface roughness, tolerance, and assembling failure that occur during the molding of the frame and may be a factor causing fire in some case.

The pocket tray 95 may be accommodated in the pocket accommodation part 91 of the pocket part 90. The pocket tray 95 may have a recessed space for collecting the oil and the food waste flowing down from the front end of the heating plate 70 in the pocket accommodation part 91.

In detail, the pocket tray 95 may include a tray body 951 accommodated in the pocket accommodation part 91 and having a recessed space, a tray extension part 952 extending upward from a front end of the tray body 951, and a handle 953 bent to be held by the user at an upper end of the tray extension part 952.

The handle 953 may have a planar shape and be disposed at a height corresponding to the top surface of the frame 60. Also, both ends of the handle 953 may be seated on the tray seating part 631 of the pocket mounting part 63. The handle 953 may be made of a material having low thermal conductivity so that the user more easily detaches the pocket tray 95. Also, when the pocket tray 95 is mounted, the pocket tray 95 may occupy most of the inner space of the pocket accommodation part 91. Particularly, the coupling member coupled inside the pocket accommodation part 91 may be covered.

Also, in the state in which the pocket tray 95 is mounted inside the pocket accommodation part 91, the rear end of the pocket tray 95 may be disposed below the heating plate 70 and also be disposed further behind the front end of the heating plate 70. Thus, all of the foreign substance and oil flowing along the heating plate 70 and the oil formed on the end of the heating plate 70 may be introduced into the pocket tray 95.

Figure 20:
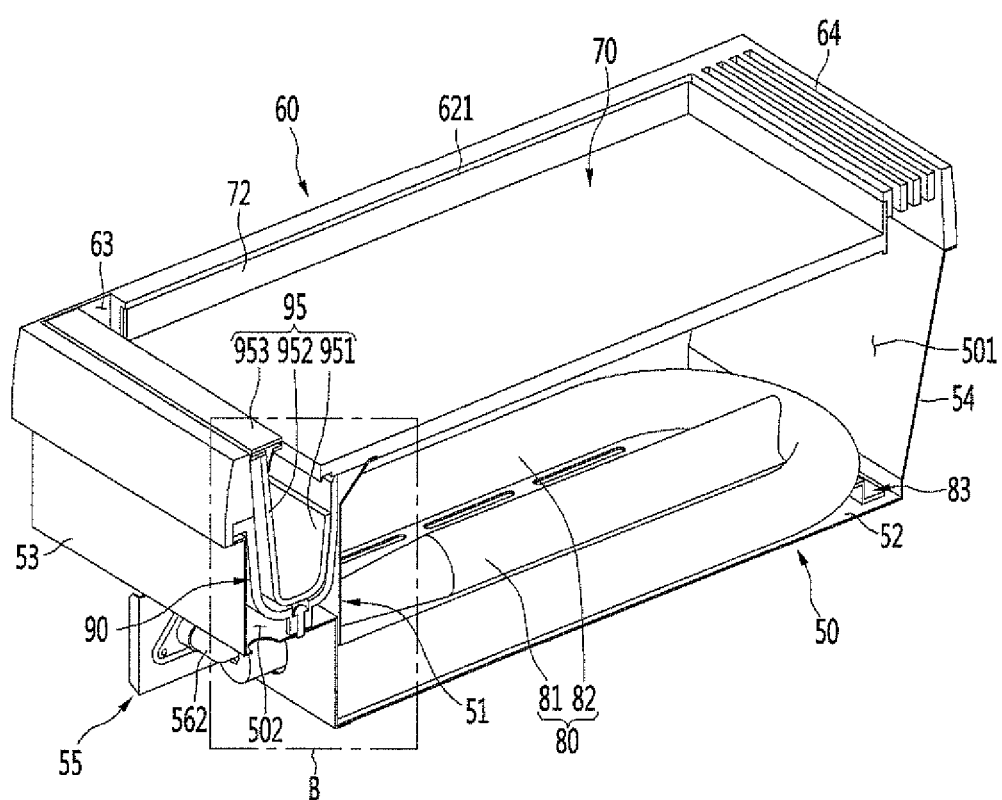
FIG. 20 is a cutaway perspective of the griddle.

FIG. 20 is a cutaway perspective of the griddle. Also, FIG. 21 is an enlarged view of a portion "B" of FIG. 20. Also, FIG. 22 is an enlarged view of a portion "C" of FIG. 7.

As illustrated in the drawings, in the state in which the pocket part 90 is mounted, the front end of the heating plate 70 may further extend to the inside of the pocket part 90. That is, the front end of the heating plate 70 may protrude from the rear end of the pocket part 90. Also, a plate groove 711 may be defined in the bottom surface of the heating plate 70 protruding to the inside of the pocket part 90.

The plate groove 711 may extend up to each of both left and right ends of the heating plate 70 and have a predetermined depth. Thus, when the oil flowing down along a surface of the heating plate 70 flows along the front end of the heating plate 70, the oil may be collected in the plate groove 711 to drop down. As a result, the oil may not be introduced into the gap between the heating plate 70 and the upper end of the pocket part 90 but drop down into the pocket tray 95 so as to be collected in the pocket try.

Also, the pocket inclined part 94 may be further disposed on the rear part 923 of the pocket part 90 contacting the bottom surface of the heating plate 70. The pocket inclined part 94 may have an inclination that gradually increases backward. The upper end of the pocket inclined part 94 may contact the bottom surface of the heating plate 70, which is disposed behind the plate groove 711. Thus, even though the oil flowing along the bottom surface of the heating plate 70 by passing through the plate groove 711 flows, the oil may also flow down along the inclined surface of the pocket inclined part 94 to prevent the oil from being introduced into the heating space 501.

Also, the rear part 923 may be firmly coupled to the bottom surface of the heating plate 70 by the coupling member 923b to prevent the heat of the heating space 501 from being transferred to the pocket part 90 and also prevent the oil of the pocket part 90 from being introduced into the heating space 501.

Also, a contact part of the barrier 51 may be pressed downward by the bottom surface of the heating plate 70, and thus, the barrier 51 may be closely attached to the heating plate 70 by elasticity of the inclined part 512 of the barrier 51. Due to this structure, the heating space 501 may be more sealed, and thus, the heat of the heating space 501 may be prevented from being transferred to the pocket part 90.

Also, the rear part 923 may be disposed in the space defined by the inclined part 512 of the barrier 51, and the coupled structure of the rear part 923 and the heating plate 70 may also be disposed in the upper space of the inclined part 512.

The pocket part 90 may be coupled to the housing 50 by the coupling member 93 coupled to the bottom of the pocket part 90. Thus, when the pocket tray 95 is removed, and the coupling member 93 is released, the housing 50 and the frame 60 may be separated from each other.

The griddle device and the cooking apparatus having the same according to the embodiment may have the following effects.

In the griddle device according to an embodiment, the oil generated during the cooking may be prevented from being introduced to minimize the possibility of the fire due to the introduction of the oil, thereby securing the safety.

In the griddle device according to the embodiment, the heating plate may be easily coupled and fixed by the coupling member that is coupled from one side thereof, thereby improving the workability and the productivity.

Also, the pocket part may be separately provided to be coupled to the frame. Thus, the frame may be more simplified in structure and also be molded through the casting.

In addition, the pocket part may be simply and easily coupled to the housing and the heating plate by the coupling member, thereby more improving the workability and the productivity.

Also, the inclined surface of the frame and the end of the side surface of the heating plate may be disposed to be misaligned. When the frame and the heating plate are coupled to each other, the gap may be prevented from standing out, thereby more improving the quality of the outer appearance.

In the cooking apparatus according to the embodiment, the various cooking modules including the griddle may be disposed in the cooktop part to improve the use convenience.

Particularly, the cooking modules including the griddle may be variously combined with each other on the cooktop part, and also, the cooking module having a necessary function may include the griddle and be provided in plurality to be selectively mounted.

Also, the cooking modules may be provided to have the same length in the front and rear direction and the width that is equal to the unit length or a multiple of the unit length. Thus, the cooking module may be freely disposed within the unit area provided on the cooktop part.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A griddle device comprising:
  a housing having an open top surface;
  a burner provided in the housing;
  a frame disposed along an open circumference of an upper end of the housing and having a frame opening;
  a heating plate coupled to the frame to cover a portion of the frame opening and providing a cooking surface heated by the burner; and
  a pocket part configured to cover another portion of the frame opening at one end of the heating plate and recessed to provide a space in which oil or residue generated during cooking is accommodated, wherein the pocket part is mounted to be connected between the frame and the heating plate, and wherein the frame opening comprises:
    a plate mounting part on which the heating plate is mounted; and
    a pocket mounting part on which the pocket part is mounted at one end of the plate mounting part.

2. The griddle device according to claim 1, wherein the heating plate comprises:
  a heating part providing the cooking surface; and
  an edge part disposed along a circumference of the heating part and extending upward from the heating part to contact an inner surface of the frame opening, wherein the heating part has a thickness greater than that of the edge part.

3. The griddle device according to claim 2, wherein the heating part and the edge part are separately molded and bonded to each other through welding.

4. The griddle device according to claim 2, wherein the edge part is disposed along a remaining circumferential surface except for one end contacting the pocket part.

5. The griddle device according to claim 2, wherein a coupling member coupled to the edge part by passing through the frame is disposed on an outer surface of the frame.

6. The griddle device according to claim 1,
  wherein the pocket mounting part has a width greater than that of the plate mounting part, and both ends of the pocket mounting part are further recessed than the plate mounting part.

7. The griddle device according to claim 6, wherein a pocket edge protruding outward is disposed along an upper end of the pocket part, and wherein the pocket edge comprises:
  a front part coupled to a front end of the frame;
  a rear part coupled to a bottom surface of the heating plate; and
  a side part coupled to each of both side surfaces of the pocket mounting part.

8. The griddle device according to claim 7, wherein an accommodation groove recessed in a shape corresponding to the side part and coupled to the side part is defined in a lower end of each of both the side surfaces of the pocket mounting part.

9. The griddle device according to claim 7, wherein the heating plate further extends to the inside of the pocket part than the front part.

10. The griddle device according to claim 9, wherein a plate groove is recessed from the bottom surface of the heating plate, and the plate groove is disposed further forward than the front part.

11. The griddle device according to claim 9, wherein a pocket inclined part that is inclined from the inside of the pocket part to the heating plate is disposed on an upper end of the front part.

12. The griddle device according to claim 1, wherein an inner surface of the plate mounting part has an inclination to protrude inward from a lower side to an upper side.

13. The griddle device according to claim 1, wherein a pocket tray into which the oil or residue generated during the cooking are introduced from the heating plate are detachably accommodated inside of the pocket part, and a tray seating part on which each of both ends of the pocket tray is seated is disposed on each of both side surfaces of the pocket mounting part.

14. The griddle device according to claim 13, wherein a coupling hole is defined in an inner bottom surface of the pocket part, and the coupling member coupled inside the pocket part passes through the coupling hole and is coupled to the housing.

15. The griddle device according to claim 1, wherein a barrier partitioning the inside of the housing into front and rear spaces is provided in the housing, the burner is accommodated in the partitioned front space, and the pocket part is accommodated in the partitioned rear space.

16. The griddle device according to claim 15, wherein the barrier comprises:

a partition part vertically extending from a bottom surface of the housing;

an inclined part inclinedly extending from an upper end of the partition part; and a contact part bent from a lower end of the inclined part to support a bottom surface of the heating plate, wherein, when the heating plate is mounted, the inclined part is elastically deformed to allow the contact part to press and support the heating plate.

17. The griddle device according to claim 16, wherein the inclined part has a width less than that of the partition part so that a barrier stepped part is disposed on each of both side ends of the inclined part and the partition part, and the barrier stepped part is seated on a first stepped part that is stepped on an inner surface of the frame opening.

18. The griddle device according to claim 17, wherein a second stepped part in which an upper end of the pocket part is accommodated is further disposed on an inner surface of the frame opening above the first stepped part, and the second stepped part further protrudes than the first stepped part.

19. A cooking apparatus, comprising:

an oven on which a door that opens and closes a cavity defining a cooking space is disposed on a front surface thereof;

a cooktop provided above the oven to define a top surface of the cooking apparatus; and an exhaust provided behind the cooktop to exhaust heat of the oven and the cooktop, wherein the cooktop comprises:

a module mounting space provided in the cooktop and having an open top surface; and a griddle device mounted in the module mounting space to define at least a portion of a top surface of the cooktop, wherein the griddle device comprises the griddle device of claim 1.

20. The cooking apparatus according to claim 19, wherein a gas stove defining a remaining portion of the top surface of the cooktop is disposed at a side of the griddle device, and wherein the frame is made of a same material as a grating defining an outer appearance of an upper portion of the gas stove and disposed at a same height as the grating.

\* \* \* \* \*